United States Patent
Martin et al.

(10) Patent No.: US 12,287,297 B1
(45) Date of Patent: Apr. 29, 2025

(54) VIDEO PIPE INSPECTION SYSTEMS AND METHODS WITH SENSOR DATA

(71) Applicant: SeeScan, Inc., San Diego, CA (US)

(72) Inventors: Michael J. Martin, San Diego, CA (US); Mark S. Olsson, La Jolla, CA (US); Alexander L. Warren, Escondido, CA (US)

(73) Assignee: SeeScan, Inc., San Diego, CA (US)

( * ) Notice: Subject to any disclaimer, the term of this patent is extended or adjusted under 35 U.S.C. 154(b) by 0 days.

(21) Appl. No.: 18/135,661

(22) Filed: Apr. 17, 2023

Related U.S. Application Data

(63) Continuation of application No. 17/845,721, filed on Jun. 21, 2022, now Pat. No. 11,639,900, which is a continuation of application No. 16/559,576, filed on Sep. 3, 2019, now Pat. No. 11,402,337.

(60) Provisional application No. 62/726,500, filed on Sep. 4, 2018.

(51) Int. Cl.
| | |
|---|---|
| *H04N 23/66* | (2023.01) |
| *G01N 21/954* | (2006.01) |
| *H04N 23/51* | (2023.01) |
| *H04N 23/54* | (2023.01) |
| *H04N 23/617* | (2023.01) |
| *H04N 23/695* | (2023.01) |
| *H04R 1/02* | (2006.01) |
| *H04R 1/04* | (2006.01) |
| *H04N 23/50* | (2023.01) |

(52) U.S. Cl.
CPC .......... *G01N 21/954* (2013.01); *H04N 23/51* (2023.01); *H04N 23/54* (2023.01); *H04N 23/617* (2023.01); *H04N 23/66* (2023.01); *H04N 23/695* (2023.01); *H04R 1/028* (2013.01); *H04R 1/04* (2013.01); *G01N 2021/9542* (2013.01); *H04N 23/555* (2023.01)

(58) Field of Classification Search
CPC .... G01N 21/954; H04N 23/66; H04N 23/617; H04N 23/51; H04N 23/695; H04N 23/54; H04R 1/028; H04R 1/04
USPC .......................................................... 348/84
See application file for complete search history.

(56) References Cited

U.S. PATENT DOCUMENTS

| | | | |
|---|---|---|---|
| 8,547,428 B1 | 10/2013 | Olsson et al. | |
| 2014/0063229 A1* | 3/2014 | Olsson ................. | G01N 21/954 348/84 |
| 2014/0152802 A1* | 6/2014 | Olsson ................... | H04N 23/45 348/84 |
| 2014/0204197 A1* | 7/2014 | Olsson ................... | H04N 23/66 348/84 |

(Continued)

FOREIGN PATENT DOCUMENTS

WO  2013116374 A2  8/2013

OTHER PUBLICATIONS

International Searching Authority, "Written Opinion of the International Searching Authority" for PCT Patent Application No. PCT/US2019/049394, Mar. 12, 2020, European Patent Office, Munich.

*Primary Examiner* — Nguyen T Truong
(74) *Attorney, Agent, or Firm* — Steven C. Tietsworth, Esq.; Michael J. Pennington, Esq.

(57) ABSTRACT

Video inspection systems are disclosed. In one embodiment a video camera for use in a pipe inspection system includes a camera head including an outer housing, a camera module assembly including video and non-video sensors, a processing circuit, and a data link receiver.

19 Claims, 21 Drawing Sheets

(56) References Cited

U.S. PATENT DOCUMENTS

2018/0113049 A1* 4/2018 Chung ............... G01M 5/0066

* cited by examiner

Method 1000

*Method 1200*

VIDEO PIPE INSPECTION SYSTEMS AND METHODS WITH SENSOR DATA

FIELD

This disclosure relates generally to video pipe inspection systems, devices, and methods to inspect interior of pipes and other conduits, cavities, or voids. More specifically, but not exclusively, this disclosure relates to video pipe inspection systems, devices, and methods integrated with non-video data recording such as acoustic/audio recording and associated data transmission functionality.

BACKGROUND

There are many situations where it is desirable to internally inspect pipes or other difficult to access cavities or voids that are already in place, either underground, in a building, or underwater. For example, sewer and drain pipes frequently must be internally inspected to diagnose any existing problems and to determine if there are any breaks causing leakage or obstructions that might impair the free flow of waste. Likewise, other pipes such as water pipes, gas pipes, electrical conduits, and fiber optic conduits need to be internally inspected for similar reasons.

Traditional systems and method for inspecting the pipes include a video camera head disposed on a push-cable that is pushed down a pipe to display the interior of the pipe on a camera control unit (CCU) or other video display. Such video camera heads are essential tools to visually inspect the interior of the pipes and to identify defects caused by, for example, ingress of roots, pipe cracks or breaks, corrosion, leakage, and/or other defects or blockages inside the pipe. Traditional pipe inspection systems, though useful, are limited to visual inspection of pipes or cavities. Existing lateral push-cable camera systems generally include analog cameras due to limitations in power and signal provisioning down a lengthy push-cable, where the camera head must be sufficiently small to fit into and navigate the bends and turns of commonly used pipe diameters. Such analog video systems fail to generate non-video in-pipe data that may be useful in determining problems within an inspected pipe.

One solution to communicating non-video in-pipe data may be to simply add one or more additional wires to a push-cable by which such data may be communicated. Whereas such an approach may seem to achieve the goal of communicating in-pipe data to other above ground system devices, such a solution is less than ideal for lateral push-cable camera systems. As lateral push-cable camera systems must be ruggedized to survive being forced into and moved inside a pipe or other cavity that may often be filled with dirt, grime, and harsh chemicals; and increasing the number of wires in a push-cable may add numerous additional points of failure and thereby increase the fragility to the push-cable and overall pipe inspection system.

Accordingly, there is a need in the art to address the above-described as well as other problems. Likewise, there is an opportunity to retrofit existing analog pipe inspection systems to provide additional non-video in-pipe data through existing communications channels.

SUMMARY

This disclosure relates generally to video pipe inspection systems, devices, and methods to inspect, for example, the interior of pipes and other conduits, cavities, or voids. More specifically, but not exclusively, this disclosure relates to video pipe inspection systems, devices, and methods integrated with non-video data recording and transmission functionality.

According to one aspect, a video camera for pipe inspection is disclosed that may include a camera head having an outer housing with a hollow interior, a camera module assembly including one or more image sensors supported inside the housing for generating video and still images corresponding to an interior of a pipe, and one or more non-video related sensors for generating non-video data which may include an acoustic/audio sensor for generating acoustic data corresponding to sounds and/or other audio/acoustic signals inside of the same pipe. The camera head may further include a processing circuit coupled to the camera head assembly to receive video signals from the image sensor(s) and non-video data from the non-video sensor(s), including the acoustic data from the interior of the pipe and/or other non-video data as described subsequently herein.

The processing element may encode and embed audio and other non-video data into the video signal via modulating the video signal during the vertical blanking interval (VBI) between frames and/or sparsely embedding the non-video data in the active video frame such that it may later be corrected via overwriting the non-video data lines at the expense of a loss of resolution in the video frame. In specific embodiments, non-video data may be embedded in alternating lines or portions of alternating lines of an interlaced video signal in known locations for transmission to a coupled camera control unit (CCU) or like computing device over a common transmission channel. The camera head may further include a data link receiver circuit to receive program instructions from the CCU or other directly or indirectly wired or wirelessly connected computing device to configure or reconfigure the camera head software and/or firmware. The camera head may retrofit to existing pipe inspection systems wherein video signal and non-video data to be communicated via a single communication channel.

Another aspect relates to a pipe inspection system having a camera head as described above disposed on a resilient, flexible video push cable that may be stored in and be fed from a cable reel rotatably mounted on a support frame. The hardware present in the push-cable and cable reel may be that present in existing pipe inspection systems allowing the camera head to retrofit into such systems and allow video signal and non-video data to be communicated via a single communication channel of some pre-existing push-cables and associated inspection systems, such as certain systems provided by SeeScan, Inc., assignee of the instant application. The pipe inspection system may further include a camera control unit (CCU) coupled at the proximal end of the push-cable generally via the cable reel. The CCU may be configured to receive the embedded video signal and further decouple and decode the embedded non-video data and display and store a corrected video as well as present, store, and/or utilize the embedded data. The CCU may generate a data link signal at the CCU that is out of band to the embedded video signal that may communicate data to the camera head.

Another aspect relates to a method for embedding and transmitting non-video data in active pipe inspection video frames. The method includes generating video signal and non-video data, encoding the non-video data, embedding the non-video data at known interspersed line locations in the active video, communicating the embedded video to a CCU and/or other display and user input element, decoupling the embedded non-video data and video, decoding the non-video data, using adjacent lines of video signal to the non-video lines to correct the video at the non-video line locations, and displaying and/or storing and/or using the corrected video and non-video data.

Another aspect relates to a method for testing the health of a push-cable in a pipe inspection system. The method includes measuring voltage at the CCU and camera head, retrieving push-cable length, calculating resistance per unit length of push-cable, storing the resistance per unit length of push-cable associated with a time, date, and cable reel serial number or like identifier, comparing the resistance per unit length of push-cable and associated data with an initial value corresponding to desired resistance per unit length of push-cable data, and generating a warning wherein the resistance per unit length of push-cable and associated data falls beyond a threshold.

Another aspect relates to a method for compensating for impedance of a video signal transmitted via a push-cable. The method includes measuring the impedance of a data link signal at a camera head, comparing the measured impedance to expected impedance, determining if variance in measured impedance to expected impedance is within a tolerable threshold, and adjusting the transmitted video signal to compensate for any variance outside of the threshold.

Another aspect relates to a method for compensating for in-pipe noise due to camera head movement. The method includes measuring motion of the camera head, determining if the measured motion is above a predetermined threshold, and lowering the audio gain at the microphone in the camera head wherein motion beyond the threshold is detected.

Another aspect relates to a method for boot loading a camera head from a CCU. The method includes turning on the pipe inspection system, receiving camera head data at the CCU, sending firmware/software from the CCU to the camera head based on received camera head data.

Another aspect relates to a method for authenticating a camera head in a pipe inspection system. The method includes turning on the pipe inspection system, receiving authentication data at the CCU from the camera head, evaluating the authentication data, and disabling the pipe inspection system where the authentication data has failed.

Another aspect relates to a method for adding authentication data to an inspection. The method includes beginning the inspection and generating video and non-video inspection data, communicating inspection identifying data to a cloud server, assigning authentication data to the inspection, and storing authentication data referencing the inspection on a cloud server and store the inspection containing the same authentication data.

Another aspect relates to a method for authentication an inspection. The method includes actuating playback of an inspection, comparing authentication data of the inspection stored on a cloud server, and disallowing playback of the inspection wherein the authentication data does not match and allowing playback of the inspection wherein the authentication data does match.

Another aspect relates to a method for phase synchronizing an electromagnetic sonde. The method includes receiving GNSS signals at the cable reel and/or CCU and utility locator device, communicating a pulsed timing signal to the electromagnetic sonde, generating and broadcasting a signal at the electromagnetic sonde based off the pulsed timing signal, and receiving the signal broadcasted by the electromagnetic sonde at the utility locator device that also has received the GNSS signals for timing.

Another aspect relates to a video camera system for use in internal pipe inspection. The system may include, for example, a camera head. The camera head may include an outer housing having a hollow interior, a camera module assembly, the camera module assembly including one or more image sensors supported inside the housing for generating video and still image data corresponding to an interior of a pipe and one or more non-video sensors for generating non-video data, the one or more non-video sensors including at least an acoustic sensor for generating acoustic data corresponding to acoustic signals sensed inside of the pipe. The system may include a processing circuit, operatively coupled to the camera module assembly, to receive video data from the image sensors and non-video sensors including at least the acoustic data from the interior of the pipe and to further encode and embed acoustic and other non-video into the video signal via modulating the video signal during the vertical blanking interval (VBI) between frames and/or embedding non-video data in alternating lines or portions of alternating lines of an interlaced video signal in pre-defined locations for transmission to a coupled electronic device over a common transmission channel. The system may include a data link receiver circuit to receive program instructions from a camera control unit or other directly or indirectly wired or wirelessly connected computing device to configure or reconfigure camera head software and/or firmware.

Another aspect relates to a video pipe inspection system. The system may include, for example, a video camera head. The video camera head may include an outer housing having a hollow interior and a camera module assembly. The camera module assembly may include an image sensor supported inside the housing for generating an embedded video signal representing real time or near real time images of scenes in view of the image sensor and one or more non-video sensors for generating non-video sensor data for embedding into the video signal via modulating the video signal during the vertical blanking interval (VBI) between frames and/or embedding the non-video sensor data in alternating lines or portions of alternating lines of an interlaced video signal in predefined locations. The system may include a datalink receiver circuit communicatively coupled to a camera control unit or other computing device to receive program instructions from the camera control unit or other connected computing device to configure or reconfigure camera head software and/or firmware. The system may include a support frame, a cable reel rotatably mounted on the support frame, a a resilient, flexible video push cable storable in continuous turns in the push reel and having a distal end operatively connected to the video camera head and a proximal end operatively connected to a central hub of the push reel, the push cable including at least a video conductor for conveying an embedded video signal to a camera control unit (CCU) and data link signal to the camera head, the push-cable further having a predetermined resiliency and flexibility to permit the push-cable to be unwound from the push reel in order to force the camera head a substantial distance down a length of pipe, and a camera control unit (CCU) including one or more processing elements programmed to receive the embedded video signal, decouple and decode the embedded non-video data, display and store the video as well as display, store, and/or send the embedded data, wherein the sending includes generating a data link signal at the CCU that is out of band to the embedded video signal for communicating data to the camera head.

Another aspect relates to a method for embedding and transmitting non-video data in pipe inspection video signals. The method may include, for example, generating video and non-video data, encoding the non-video data, embedding the non-video data at known interspersed line or pixel locations in the active video, communicating the embedded video to a CCU or other display and user input element, decoupling the embedded non-video data at known line or pixel locations in the embedded video, decoding the non-video data, using adjacent video lines or pixels to correct video image at the previously embedded non-video line or pixel locations, and/or displaying, storing, and/or using the corrected video and non-video data.

Another aspect relates to a method for testing the health of a push-cable in a video pipe inspection system. The method may include, for example, measuring voltage at the CCU and camera head, retrieving a pre-defined push-cable length, calculating resistance per unit length of push-cable based on the push-cable length, storing the resistance per unit length of push-cable associated with a time, date, and a cable reel serial number or other device-specific identifier, comparing the resistance per unit length of push-cable and associated data with an initial value corresponding to a predefined desired resistance per unit length of push-cable data, and/or generating a warning wherein the resistance per unit length of push-cable and associated data falls beyond a threshold based on the predefined desired resistance.

Another aspect relates to a method for compensating for impedance of a video signal transmitted via a push-cable in a pipe inspection system. The method may include, for example, measuring the impedance of a data link signal at a camera head, comparing the measured impedance to an expected impedance, determining if variance in measured impedance to expected impedance is within a predefined threshold, and/or adjusting the transmitted video signal to compensate for any variance outside of the predefined threshold.

Another aspect relates to a method for compensating for in-pipe noise due to camera head movement in a video pipe inspection system. The method may include, for example, measuring motion of the camera head, determining if the measured motion is above a predetermined threshold and/or lowering the audio gain at the microphone in the camera head when motion beyond the threshold is detected.

Another aspect relates to a method for boot loading a camera head from a CCU in a video pipe inspection system. The method may include, for example, turning on the pipe inspection system, receiving camera head data at the CCU, and/or sending firmware/software from the CCU to the camera head based on received camera head data.

Another aspect relates to a method for authenticating a camera head in a video pipe inspection system. The method may include, for example, turning on the pipe inspection system, receiving authentication data at the CCU from the camera head, evaluating the authentication data, and/or disabling the pipe inspection system where the authentication data has failed.

Another aspect relates to a method for generating authentication data in an inspection. The method may include, for example, beginning the inspection by generating video and non-video inspection data, communicating identifying data associated with the inspection to a cloud server, assigning authentication data to the inspection, storing the authentication data on the cloud server, and/or storing the generated inspection data with the same authentication data. The identifying data may include geographic position along the Earth's surface. The identifying data may include time data corresponding to the inspection being performed. The identifying data may include the uninterrupted, unaltered recorded inspection or a portion of the inspection.

Another aspect relates to a method for authentication of a pipe inspection. The method may include, for example, actuating playback of an inspection, comparing authentication data of the inspection to stored authentication data on a remote cloud server, and/or disallowing playback at a playback device when the authentication data does not match authentication information and/or allowing playback of the inspection where authentication data matches the authentication information.

Another aspect relates to a method for phase synchronizing an electromagnetic sonde, wherein the sonde generates a dipole magnetic field for sensing by a locator or similar device. The method may include, for example, receiving a GNSS signal at cable reel and/or at a CCU and a utility locator device, communicating a pulsed timing signal from the cable reel and/or CCU to an electromagnetic sonde, generating and broadcasting a signal from the electromagnetic sonde based on the pulsed timing signal, and/or receiving the broadcasted electromagnetic sonde signal having a predefined phase pattern to the utility locator device from the GNSS signal. Various additional aspects are described subsequently herein.

Various additional aspects, features, devices, systems, and functionality are further described below in conjunction with the appended Drawings.

BRIEF DESCRIPTION OF THE DRAWINGS

The present application may be more fully appreciated in connection with the following detailed description taken in conjunction with the accompanying drawings, wherein.

DESCRIPTION OF EMBODIMENTS

Overview

Figure 1:
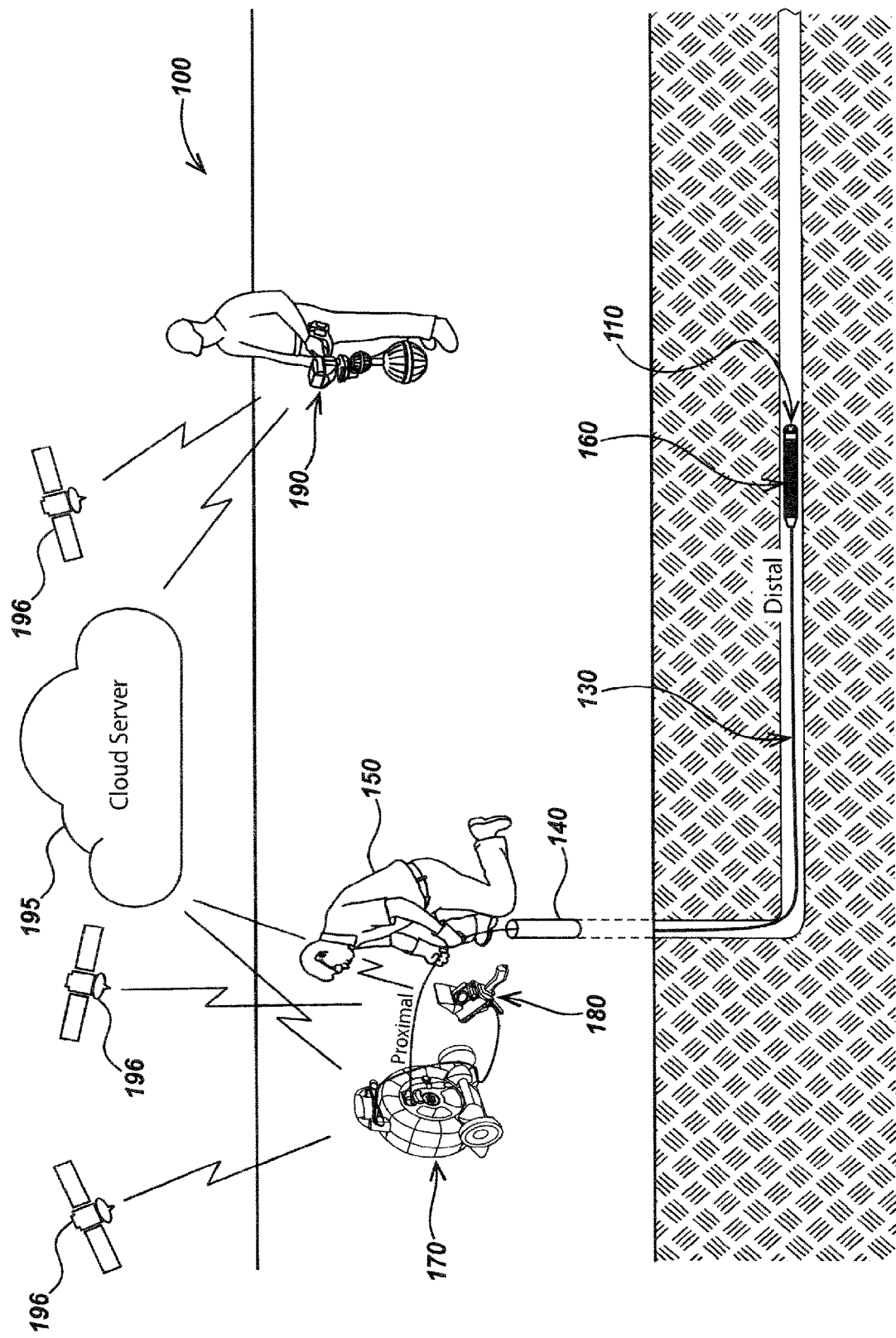
FIG. 1 is an illustration of a pipe inspection system embodiment in accordance with certain aspects.

This disclosure relates generally to lateral push-cable based video pipe inspection systems, devices, and methods for inspection the interior of pipes and other conduits, cavities, or voids. More specifically, but not exclusively, this disclosure relates to video pipe inspection systems, devices, and methods integrated with non-video data, such as acoustic data, as well as recording and transmission functionality for the video and non-video data.

According to various aspects of the present disclosure, a video camera for pipe inspection may include a camera head having an outer housing with a hollow interior, a camera module assembly including one or more image sensors supported inside the housing for generating video and still images corresponding to an interior of a pipe, and one or more non-video related sensors for generating non-video data which includes at least an acoustic sensor. The acoustic sensor may sense human audible and/or other wavelengths of acoustic signals such as infrasound or ultrasound wavelengths. The acoustic sensor may generate audio/acoustic data corresponding to sounds inside of the same pipe. The camera head may further include a processing circuit coupled to the camera module assembly to receive video signal from the image sensor(s) and non-video data from the non-video sensor(s) including at least the acoustic/audio data from the interior of the pipe. The processing element may encode and embed acoustic/audio and other non-video data into the video signal via modulating the video signal during the vertical blanking interval (VBI) between frames and/or sparsely embedding the non-video data in the active video frame such that it may later be corrected via overwriting the non-video data lines at the expense of a loss of resolution in the video frame.

In specific embodiments, non-video data (e.g., acoustic/audio and/or other non-video sensed data such as physical parameter data, condition, data, or other data such as described subsequently herein) may be embedded in alternating lines or portions of alternating lines of an interlaced video signal in known, pre-defined locations for transmission to a coupled camera control unit (CCU) or like computing device over a common transmission channel. Non-video data may also be embedded in other portions of video or blanking intervals or during other non-used or otherwise available signaling slots.

The camera head may further include a data link receiver circuit to receive program instructions from the CCU or other directly or indirectly wired or wirelessly connected computing device to configure or reconfigure the camera head software and/or firmware. The camera head may retrofit to existing pipe inspection systems wherein video signal and non-video data to be communicated via a single communication channel.

The single communication channel may be a robust communications channel for transmitting data to and from camera heads or other in-pipe devices and other associated inspection system devices above ground. Such a pipe inspection system may include a resilient, flexible video push cable that may be stored in and be fed from a cable reel rotatably mounted on a support frame and a camera control unit (CCU) coupled at the proximal end of the push-cable generally via the cable reel. The CCU may be configured to receive the video signal and further decouple and decode the embedded non-video data and display and store a corrected video as well as present, store, and/or utilize the embedded data.

The CCU may generate a data link signal at the CCU that is out of band to the embedded video signal and communicate data to the camera head. This pipe inspection system and camera of the current disclosure may further enable various related methods. Methods of the present disclosure include those relating to embedding and transmitting non-video data in active pipe inspection video frames, testing the health of a push-cable in a pipe inspection system, compensating for impedance of a video signal transmitted via a push-cable, compensating for in-pipe noise due to camera head movement, a method for boot loading a camera head from a CCU, and authenticating a camera head in a pipe inspection system which may function as a theft deterrent.

For example, in one aspect, the disclosure relates to a video camera system for use in internal pipe inspection. The system may include, for example, a camera head. The camera head may include an outer housing having a hollow interior, a camera module assembly, the camera module assembly including one or more image sensors supported inside the housing for generating video and still image data corresponding to an interior of a pipe and one or more non-video sensors for generating non-video data, the one or more non-video sensors including at least an acoustic sensor for generating acoustic data corresponding to acoustic signals sensed inside of the pipe. The system may include a processing circuit, operatively coupled to the camera module assembly, to receive video data from the image sensors and non-video sensors including at least the acoustic data from the interior of the pipe and to further encode and embed acoustic and other non-video into the video signal via modulating the video signal during the vertical blanking interval (VBI) between frames and/or embedding non-video data in alternating lines or portions of alternating lines of an interlaced video signal in pre-defined locations for transmission to a coupled electronic device over a common transmission channel. The system may include a data link receiver circuit to receive program instructions from a camera control unit or other directly or indirectly wired or wirelessly connected computing device to configure or reconfigure camera head software and/or firmware.

The one or more image sensors may, for example, be high dynamic range (HDR) sensors and the acoustic sensors sense at least human-audible sound signals. The camera head may be a mechanical self-leveling camera head or a digital self-leveling camera head. The acoustic sensors may sense at least human-audible sound signals. The acoustic sensors may sense infrasonic sounds. The acoustic sensors may sense ultrasonic sounds. The camera firmware may be boot loaded via the camera control unit or via other wired or wirelessly connected electronic computing devices. The camera head may be authenticated at a communicatively coupled CCU as a theft deterrent prior to allowing video generation or transmission from the camera head to a communicatively coupled device. The acoustic/audio sensor may be a 24 bit or higher resolution micro-electromechanical systems (MEMs) microphone device or similar or equivalent device. Material comprising the pipe may be determined in post processing based on comparison of a signature of collected audio data with a reference audio signature.

The non-video sensors may, for example, be one or more humidity sensors. Excess humidity, for example above a predefined humidity threshold, may be sensed and detected by the one or more humidity sensors within the camera head. Sensed excess humidity may be used to initiate a high humidity warning to an associated video inspection system user, such as via a CCU or other communicatively coupled device or system. The non-video sensors may include one or more motion sensors. The one or more motion sensors may include an accelerometer. The one or more motion sensors may include a six, nine, or higher dimensional axis motion sensor. The one or more motion sensors may include one or more six axis motion processing sensors and/or one or more magnetometers. Gain control of the audio sensor may be determined by motion sensed by one of the one or more the motion sensors.

In another aspect the disclosure relates to a video pipe inspection system. The system may include, for example, a video camera head. The video camera head may include an outer housing having a hollow interior and a camera module assembly. The camera module assembly may include an image sensor supported inside the housing for generating an embedded video signal representing real time or near real time images of scenes in view of the image sensor and one or more non-video sensors for generating non-video sensor data for embedding into the video signal via modulating the video signal during the vertical blanking interval (VBI) between frames and/or embedding the non-video sensor data in alternating lines or portions of alternating lines of an interlaced video signal in predefined locations. The system may include a datalink receiver circuit communicatively coupled to a camera control unit or other computing device to receive program instructions from the camera control unit or other connected computing device to configure or reconfigure camera head software and/or firmware. The system may include a support frame, a cable reel rotatably mounted on the support frame, a a resilient, flexible video push cable storable in continuous turns in the push reel and having a distal end operatively connected to the video camera head and a proximal end operatively connected to a central hub of the push reel, the push cable including at least a video conductor for conveying an embedded video signal to a camera control unit (CCU) and data link signal to the camera head, the push-cable further having a predetermined resiliency and flexibility to permit the push-cable to be unwound from the push reel in order to force the camera head a substantial distance down a length of pipe, and a camera control unit (CCU) including one or more processing elements programmed to receive the embedded video signal, decouple and decode the embedded non-video data, display and store the video as well as display, store, and/or send the embedded data, wherein the sending includes generating a data link signal at the CCU that is out of band to the embedded video signal for communicating data to the camera head.

The system may further include, for example, an electromagnetic sonde disposed at or near the distal end of the push-cable in a predefined position relative to the camera head and/or within the camera head. The system may include one or more utility locator devices. The system may further include another display and user input element. The another display and user input element may comprise an electronic computing devices such as a smart phone or laptop computer. The embedded non-video data may include, for example, acoustic/audio data for reproduction by an audio speaker at the CCU and/or other display and user input element for a user to listen to in real time or near real time. Non-human-audible sound (e.g., infrasonic or ultrasonic sound) may be mixed to a human-audible frequency to be provided to a user. The system may further include one or more GNSS receivers or other positioning system receivers/transceivers disposed in one or more of the system devices. The electromagnetic sonde may be phase synchronized via GNSS signals received at a CCU and/or at the cable reel. One or more of the system devices may be configured to communicate with a cloud server. The inspection data may be authenticated so as to prevent fraudulent or unauthorized inspection reports or other unauthorized image, video, or data generation or provision.

In another aspect the disclosure relates to a method for embedding and transmitting non-video data in pipe inspection video signals. The method may include, for example, generating video and non-video data, encoding the non-video data, embedding the non-video data at known interspersed line or pixel locations in the active video, communicating the embedded video to a CCU or other display and user input element, decoupling the embedded non-video data at known line or pixel locations in the embedded video, decoding the non-video data, using adjacent video lines or pixels to correct video image at the previously embedded non-video line or pixel locations, and/or displaying, storing, and/or using the corrected video and non-video data.

The encoding of non-video data may, for example, be done by modulating luminance of video data at predefined line locations. Corrected video may be generated by replacing video lines containing embedded data with an adjacent video line containing video imagery. Corrected video may be generated by averaging the luminance values of adjacent video lines. Encoding of non-video data may be done by modulating colors of video data at known line locations. Corrected video may be generated by averaging the color values from contiguous pixels on adjacent video lines to each pixel location of the corrected lines. The non-video data may, for example, include orientation/pose data of or associated with the camera head. The orientation/pose data may be used or usable to correct orientation/pose of video images by corresponding signal processing.

In another aspect, the disclosure relates to a method for testing the health of a push-cable in a video pipe inspection system. The method may include, for example, measuring voltage at the CCU and camera head, retrieving a predefined push-cable length, calculating resistance per unit length of push-cable based on the push-cable length, storing the resistance per unit length of push-cable associated with a time, date, and a cable reel serial number or other device-specific identifier, comparing the resistance per unit length of push-cable and associated data with an initial value corresponding to a predefined desired resistance per unit length of push-cable data, and/or generating a warning wherein the resistance per unit length of push-cable and associated data falls beyond a threshold based on the predefined desired resistance.

In another aspect, the disclosure relates to a method for compensating for impedance of a video signal transmitted via a push-cable in a pipe inspection system. The method may include, for example, measuring the impedance of a data link signal at a camera head, comparing the measured impedance to an expected impedance, determining if variance in measured impedance to expected impedance is within a predefined threshold, and/or adjusting the transmitted video signal to compensate for any variance outside of the predefined threshold.

In another aspect, the disclosure relates to a method for compensating for in-pipe noise due to camera head movement in a video pipe inspection system. The method may include, for example, measuring motion of the camera head, determining if the measured motion is above a predetermined threshold and/or lowering the audio gain at the microphone in the camera head when motion beyond the threshold is detected.

In another aspect, the disclosure relates to a method for boot loading a camera head from a CCU in a video pipe inspection system. The method may include, for example, turning on the pipe inspection system, receiving camera head data at the CCU, and/or sending firmware/software from the CCU to the camera head based on received camera head data.

In another aspect, the disclosure relates to a method for authenticating a camera head in a video pipe inspection system. The method may include, for example, turning on the pipe inspection system, receiving authentication data at the CCU from the camera head, evaluating the authentication data, and/or disabling the pipe inspection system where the authentication data has failed.

In another aspect, the disclosure relates to a method for generating authentication data in an inspection. The method may include, for example, beginning the inspection by generating video and non-video inspection data, communicating identifying data associated with the inspection to a cloud server, assigning authentication data to the inspection, storing the authentication data on the cloud server, and/or storing the generated inspection data with the same authentication data. The identifying data may include geographic position along the Earth's surface. The identifying data may include time data corresponding to the inspection being performed. The identifying data may include the uninterrupted, unaltered recorded inspection or a portion of the inspection.

In another aspect, the disclosure relates to a method for authentication of a pipe inspection. The method may include, for example, actuating playback of an inspection, comparing authentication data of the inspection to stored authentication data on a remote cloud server, and/or disallowing playback at a playback device when the authentication data does not match authentication information and/or allowing playback of the inspection where authentication data matches the authentication information.

In another aspect, the disclosure relates to a method for phase synchronizing an electromagnetic sonde, wherein the sonde generates a dipole magnetic field for sensing by a locator or similar device. The method may include, for example, receiving a GNSS signal at cable reel and/or at a CCU and a utility locator device, communicating a pulsed timing signal from the cable reel and/or CCU to an electromagnetic sonde, generating and broadcasting a signal from the electromagnetic sonde based on the pulsed timing signal, and/or receiving the broadcasted electromagnetic sonde signal having a predefined phase pattern to the utility locator device from the GNSS signal. Various additional aspects are described subsequently herein.

Various aspects of video inspection systems, apparatus, devices, configurations and methods that may be used in conjunction with the disclosures and embodiments herein in various additional embodiments are described in co-assigned patents and patent applications including: U.S. Pat. No. 6,545,704, issued Apr. 7, 1999, entitled VIDEO PIPE INSPECTION DISTANCE MEASURING SYSTEM; U.S. Pat. No. 5,939,679, issued Aug. 17, 1999, entitled VIDEO PUSH CABLE; U.S. Pat. No. 6,831,679, issued Dec. 14, 2004, entitled VIDEO CAMERA HEAD WITH THERMAL FEEDBACK LIGHTING CONTROL; U.S. Pat. No. 6,862,945, issued Mar. 8, 2005, entitled CAMERA GUIDE FOR VIDEO PIPE INSPECTION SYSTEM; U.S. Pat. No. 6,908,310, issued Jun. 21, 2005, entitled SLIP RING ASSEMBLY WITH INTEGRAL POSITION ENCODER; U.S. Pat. No. 6,958,767, issued Oct. 25, 2005, entitled VIDEO PIPE INSPECTION SYSTEM EMPLOYING NON-ROTATING CABLE STORAGE DRUM; U.S. Pat. No. 7,009,399, issued Mar. 7, 2006, entitled OMNIDIRECTIONAL SONDE AND LINE LOCATOR; U.S. Pat. No. 7,136,765, issued Nov. 14, 2006, entitled A BURIED OBJECT LOCATING AND TRACING METHOD AND SYSTEM EMPLOYING PRINCIPAL COMPONENTS ANALYSIS FOR BLIND SIGNAL DETECTION; U.S. Pat. No. 7,221,136, issued May 22, 2007, entitled SONDES FOR LOCATING UNDERGROUND PIPES AND CONDUITS; U.S. Pat. No. 7,276,910, issued Oct. 2, 2007, entitled A COMPACT SELF-TUNED ELECTRICAL RESONATOR FOR BURIED OBJECT LOCATOR APPLICATIONS; U.S. Pat. No. 7,288,929, issued Oct. 30, 2007, entitled INDUCTIVE CLAMP FOR APPLYING SIGNAL TO BURIED UTILITIES; U.S. Pat. No. 7,298,126, issued Nov. 20, 2007, entitled SONDES FOR LOCATING UNDERGROUND PIPES AND CONDUITS; U.S. Pat. No. 7,332,901, issued Feb. 19, 2008, entitled LOCATOR WITH APPARENT DEPTH INDICATION; U.S. Pat. No. 7,336,078, issued Feb. 26, 2008, entitled MULTI-SENSOR MAPPING OMNIDIRECTIONAL SONDE AND LINE LOCATORS; U.S. Pat. No. 7,443,154, issued Oct. 28, 2008, entitled MULTI-SENSOR MAPPING OMNIDIRECTIONAL SONDE AND LINE LOCATOR; U.S. Pat. No. 7,498,797, issued Mar. 3, 2009, entitled LOCATOR WITH CURRENT-MEASURING CAPABILITY; U.S. Pat. No. 7,498,816, issued Mar. 3, 2009, entitled OMNIDIRECTIONAL SONDE AND LINE LOCATOR; U.S. Pat. No. 7,518,374, issued Apr. 14, 2009, entitled RECONFIGURABLE PORTABLE LOCATOR EMPLOYING MULTIPLE SENSOR ARRAYS HAVING FLEXIBLE NESTED ORTHOGONAL ANTENNAS; U.S. Pat. No. 7,557,559, issued Jul. 7, 2009, entitled COMPACT LINE ILLUMINATOR FOR LOCATING BURIED PIPES AND CABLES; U.S. Pat. No. 7,619,516, issued Nov. 17, 2009, entitled SINGLE AND MULTI-TRACE OMNIDIRECTIONAL SONDE AND LINE LOCATORS AND TRANSMITTER USED THEREWITH; U.S. Pat. No. 7,733,077, issued Jun. 8, 2010, entitled MULTI-SENSOR MAPPING OMNIDIRECTIONAL SONDE AND LINE LOCATORS AND TRANSMITTER USED THEREWITH; U.S. Pat. No. 7,741,848, issued Jun. 22, 2010, entitled ADAPTIVE MULTICHANNEL LOCATOR SYSTEM FOR MULTIPLE PROXIMITY DETECTION; U.S. Pat. No. 7,755,360, issued Jul. 13, 2010, entitled PORTABLE LOCATOR SYSTEM WITH JAMMING REDUCTION; U.S. Pat. No. 7,825,647, issued Nov. 2, 2010, entitled METHOD FOR LOCATING BURIED PIPES AND CABLES; U.S. Pat. No. 7,830,149, issued Nov. 9, 2010, entitled AN UNDERGROUND UTILITY LOCATOR WITH A TRANSMITTER A PAIR OF UPWARDLY OPENING POCKETS AND HELICAL COIL TYPE ELECTRICAL CORDS; U.S. Pat. No. 7,863,885, issued Jan. 4, 2011, entitled SONDES FOR LOCATING UNDERGROUND PIPES AND CONDUITS; U.S. Pat. No. 7,948,236, issued May 24, 2011, entitled ADAPTIVE MULTICHANNEL LOCATOR SYSTEM FOR MULTIPLE PROXIMITY DETECTION; U.S. Pat. No. 7,969,419, issued Jun. 28, 2011, entitled PRE-AMPLIFIER AND MIXER CIRCUITRY FOR A LOCATOR ANTENNA; U.S. patent application Ser. No. 13/189,844, filed Jul. 25, 2011, entitled BURIED OBJECT LOCATOR SYSTEMS AND METHODS; U.S. Pat. No. 7,990,151, issued Aug. 2, 2011, entitled TRI-POD BURIED LOCAOTR SYSTEM; U.S. Pat. No. 8,013,610, issued Sep. 6, 2011, entitled HIGH Q SELF- TUNING LOCATING TRANSMITTER; U.S. Pat. No. 8,035,390, issued Oct. 11, 2011, entitled OMNIDIRECTIONAL SONDE AND LINE LOCATOR; U.S. Pat. No. 8,106,660, issued Jan. 31, 2012, entitled SONDE ARRAY FOR USE WITH BURIED LINE LOCATOR; U.S. Pat. No. 8,203,343, issued Jun. 19, 2012, entitled RECONFIGURABLE PORTABLE LOCATOR EMPLOYING MULTIPLE SENSOR ARRAYS HAVING FLEXIBLE NESTED ORTHOGONAL ANTENNAS; U.S. patent application Ser. No. 13/584,799, filed Aug. 13, 2012, entitled BURIED OBJECT LOCATOR SYSTEMS AND METHODS; U.S. Pat. No. 8,248,056, issued Aug. 21, 2012, entitled A BURIED OBJECT LOCATOR SYSTEM EMPLOYING AUTOMATED VIRTUAL DEPTH EVENT DETECTION AND SIGNALING; U.S. Pat. No. 8,264,226, issued Sep. 11, 2012, entitled SYSTEMS AND METHODS FOR LOCATING BURIED PIPES AND CABLES WITH A MAN PORTABLE LOCATOR AND A TRANSMITTER IN A MESH NETWORK; U.S. patent application Ser. No. 13/647,310, filed Oct. 8, 2012, entitled PIPE INSPECTION SYSTEM APPARATUS AND METHODS; U.S. Pat. No. 8,289,385, issued Oct. 16, 2012, entitled PUSH-CABLE FOR PIPE INSPECTION SYSTEM; U.S. patent application Ser. No. 13/769,202, Feb. 15, 2013, entitled SMART PAINT STICK DEVICES AND METHODS; U.S. patent application Ser. No. 13/787,711, Mar. 6, 2013, entitled DUAL SENSED LOCATING SYSTEMS AND METHODS; U.S. patent application Ser. No. 13/793,168, filed Mar. 11, 2013, entitled BURIED OBJECT LOCATORS WITH CONDUCTIVE ANTENNA BOBBINS; U.S. Pat. No. 8,395,661, issued Mar. 12, 2013, entitled PIPE INSPECTION SYSTEM WITH SELECTIVE IMAGE CAPTURE; U.S. patent application Ser. No. 13/826,112, Mar. 14, 2013, entitled SYSTEMS AND METHODS INVOLVING A SMART CABLE STORAGE DRUM AND NETWEORK NODE FOR TRANSMISSION OF DATA; U.S. Pat. No. 8,400,154, issued Mar. 19, 2013, entitled LOCATOR ANTENNA WITH CONDUCTIVE BOBBIN; U.S. patent application Ser. No. 13/851,951, Mar. 27, 2013, entitled DUAL ANTENNA SYSTEMS WITH VARIABLE POLARIZATION; U.S. patent application Ser. No. 14/027,027, Sep. 13, 2013, entitled SONDE DEVICES INCLUDING A SECTIONAL FERRITE CORE STRUCTURE; U.S. Pat. No. 8,547,428, issued Oct. 1, 2013, entitled PIPE MAPPING SYSTEM; U.S. Pat. No. 8,564,295, issued Oct. 22, 2013, entitled METHOD FOR SIMULTANEOUSLY DETERMINING A PLURALITY OF DIFFERENT LOCATIONS OF THE BURIED OBJECTS AND SIMULTANEOUSLY INDICATING THE DIFFERENT LOCATIONS TO A USER; U.S. patent application Ser. No. 14/033,349, filed Sep. 20, 2013, entitled PIPE INSPECTION WITH SNAP ON PIPE GUIDES; U.S. Pat. No. 8,540,429, issued Sep. 24, 2013, entitled SNAP ON PIPE GUIDE; U.S. patent application Ser. No. 14/077,022, filed Nov. 11, 2013, entitled WEARABLE MAGNETIC FIELD UTILITY LOCATOR SYSTEM WITH SOUND FIELD GENERATION; U.S. Pat. No. 8,587,648, issued Nov. 19, 2013, entitled SELF-LEVELING CAMERA HEAD; U.S. patent application Ser. No. 14/148,649, Jan. 6, 2014, entitled MAPPING LOCATING SYSTEMS AND METHODS; U.S. Pat. No. 8,635,043, issued Jan. 21, 2014, entitled LOCATOR AND TRANSMITTER CALIBRATION SYSTEM; U.S. patent application Ser. No. 14/203,485, filed Mar. 10, 2014, entitled PIPE INSPECTION CABLE COUNTER AND OVERLAY MANAGEMENT SYSTEM; U.S. patent application Ser. No. 14/207,527, Mar. 12, 2014, entitled ROTATING CONTACT ASSEMBLIES FOR SELF-LEVELING CAMERA HEADS; U.S. patent application Ser. No. 14/207,502, Mar. 12, 2014, entitled GRADIENT ANTENNA COILS FOR USE IN LOCATING SYSTEMS; U.S. patent application Ser. No. 14/214,151, Mar. 14, 2014, entitled DUAL ANTENNA SYSTEMS WITH VARIABLE POLARIZATION; U.S. patent application Ser. No. 14/216,358, Mar. 17, 2014, entitled SMART CABLE STORAGE DRUM AND NETWEORK NODE SYSTEM AND METHODS; U.S. Pat. No. 8,717,028, issued May 6, 2014, entitled SPRING CLIPS FOR USE WITH LOCATING TRANSMITTERS; U.S. Pat. No. 8,773,133, issued Jul. 8, 2014, entitled ADAPTIVE MULTICHANNEL LOCATOR SYSTEM FOR MULTIPLE PROXIMITY DETECTION; U.S. Pat. No. 9,703,002, issued Jul. 13, 2014, entitled UTILITY LOCATOR SYSTEMS AND METHODS; U.S. Pat. No. 8,841,912, issued Sep. 23, 2014, entitled PRE-AMPLIFIER AND MIXER CIRCUITRY FOR A LOCATOR ANTENNA; U.S. patent application Ser. No. 14/935,878, Nov. 7, 2014, entitled INSPECTION CAMERA DEVICES AND METHODS WITH SELECTIVELY ILLUMINATED MULTISENSOR IMAGING; U.S. Pat. No. 8,908,027, issued Dec. 9, 2014, entitled ASYMMETRIC DRAG FORCE BEARING FOR USE WITH PUSH-CABLE STORAGE DRUM; U.S. Pat. No. 8,970,211, issued Mar. 3, 2015, entitled PIPE INSPECTION CABLE COUNTER AND OVERLAY MANAGEMENT SYSTEM; U.S. Pat. No. 8,984,698, issued Mar. 24, 2015, entitled LIGHT WEIGHT SEWER CABLE; U.S. patent application Ser. No. 14/709,301, filed May 11, 2015, entitled PIPE MAPPING SYSTEMS AND METHODS; U.S. Pat. No. 9,041,794, issued May 26, 2015, entitled PIPE MAPPING SYSTEMS AND METHODS; U.S. Pat. No. 9,057,754, issued Jun. 16, 2015, entitled ECONOMICAL MAGNETIC LOCATOR APPARATUS AND METHOD; U.S. Pat. No. 9,066,446, issued Jun. 23, 2015, entitled THERMAL EXTRACTION ARCHITECTURE FOR CAMERA HEADS, INSPECTION SYSTEMS, AND OTHER DEVICES AND SYSTEMS; U.S. patent application Ser. No. 14/749,545, Jun. 24, 2015, entitled ADJUSTABLE VARIABLE RESOLUTION INSPECTION SYSTEMS AND METHODS; U.S. patent application Ser. No. 14/797,760, Jul. 13, 2015, entitled HAPTIC DIRECTIONAL FEEDBACK HANDLES FOR LOCATING DEVICES; U.S. patent application Ser. No. 14/798,177, filed Jul. 13, 2015, entitled MARKING PAINT APPLICATOR FOR USE WITH PORTABLE UTILITY LOCATOR; U.S. Pat. No. 9,081,109, issued Jul. 14, 2015, entitled GROUND-TRACKING DEVICES FOR USE WITH A MAPPING LOCATOR; U.S. Pat. No. 9,082,269, issued Jul. 14, 2015, entitled HAPTIC DIRECTIONAL FEEDBACK HANDLES FOR LOCATION DEVICES; U.S. Pat. No. 9,080,992, issued Jul. 14, 2015, entitled ADJUSTABLE VARIABLE RESOLUTION INSPECTION SYSTEMS AND METHODS; U.S. patent application Ser. No. 14/800,490, Jul. 15, 2015, entitled UTILITY LOCATOR DEVICES, SYSTEMS, AND METHODS WITH SATELLITE AND MAGNETIC FIELD SONDE ANTENNA SYSTEMS; U.S. Pat. No. 9,085,007, issued Jul. 21, 2015, entitled MARKING PAINT APPLICATOR FOR PORTABLE LOCATOR; U.S. Pat. No. 9,134,255, issued Sep. 15, 2015, entitled PIPE INSPECTION SYSTEM WITH SELECTIVE IMAGE CAPTURE; U.S. Pat. No. 9,207,350, issued Dec. 8, 2015, entitled BURIED OBJECT LOCATOR APPARATUS WITH SAFETY LIGHTING ARRAY; U.S. patent application Ser. No. 14/970,362, Dec. 15, 2015, entitled COAXIAL VIDEO PUSH-CABLES FOR USE IN INSPECTION SYSTEMS; U.S. Pat. No. 9,222,809, issued Dec. 29, 2015, entitled PORTABLE PIPE INSPECTION SYSTEMS AND APPARATUS; U.S. patent application Ser. No. 15/434,056, Feb. 16, 2016, entitled BURIED UTILITY MARKER DEVICES, SYSTEMS, AND METHODS; U.S. Pat. No. 9,277,105, issued Mar. 1, 2016, entitled SELF-LEVELING CAMERA HEAD; U.S. Pat. No. 9,341,740, issued May 17, 2016, entitled OPTICAL GROUND TRACKING APPARATUS, SYSTEMS, AND METHODS; U.S. patent application Ser. No. 15/185,018, Jun. 17, 2016, entitled RESILIENTLY DEFORMABLE MAGNETIC FIELD TRANSMITTER CORES FOR USE WITH UTILITY LOCATING DEVICES AND SYSTEMS; U.S. patent application Ser. No. 15/187,785, Jun. 21, 2016, entitled BURIED UTILITY LOCATOR GROUND TRACKING APPARATUS, SYSTEMS, AND METHODS; U.S. Pat. No. 9,372,117, issued Jun. 21, 2016, entitled OPTICAL GROUND TRACKING APPARATUS, SYSTEMS, AND METHODS; U.S. patent application Ser. No. 15/225,623, Aug. 1, 2016, entitled SONDE-BASED GROUND-TRACKING APPARATUS AND METHODS; U.S. patent application Ser. No. 15/225,721, filed Aug. 1, 2016, entitled SONDES AND METHODS FOR USE WITH BURIED LINE LOCATOR SYSTEMS; U.S. Pat. No. 9,411,066, issued Aug. 9, 2016, entitled SONDES AND METHODS FOR USE WITH BURIED LINE LOCATOR SYSTEMS; U.S. Pat. No. 9,411,067, issued Aug. 9, 2016, entitled GROUND-TRACKING SYSTEMS AND APPARATUS; U.S. patent application Ser. No. 15/247,503, Aug. 25, 2016, entitled LOCATING DEVICES, SYSTEMS, AND METHODS USING FREQUENCY SUITES FOR UTILITY DETECTION; U.S. Pat. No. 9,927,546, issued Aug. 29, 2016, entitled PHASE SYNCHRONIZED BURIED OBJECT LOCATOR APPARATUS, SYSTEMS, AND METHODS; U.S. Pat. No. 9,435,907, issued Sep. 6, 2016, entitled PHASE SYNCHRONIZED BURIED OBJECT LOCATOR APPARATUS, SYSTEMS, AND METHODS; U.S. Pat. No. 9,448,376, issued Sep. 20, 2016, entitled HIGH BANDWIDTH PUSH-CABLES FOR VIDEO PIPE INSPECTION SYSTEMS; U.S. Pat. No. 9,468,954, issued Oct. 18, 2016, entitled PIPE INSPECTION SYSTEM WITH JETTER PUSH-CABLE; U.S. Pat. No. 9,465,129, issued Oct. 11, 2016, entitled IMAGE-BASED MAPPING LOCATING SYSTEM; U.S. Pat. No. 9,477,147, issued Oct. 25, 2016, entitled SPRING ASSEMBLIES WITH VARIABLE FLEXIBILITY FOR USE WITH PUSH-CABLES AND PIPE INSPECTION SYSTEMS; U.S. patent application Ser. No. 15/345,421, Nov. 7, 2016, entitled OMNI-INDUCER TRANSMITTING DEVICES AND METHODS; U.S. Pat. No. 9,488,747, issued Nov. 8, 2016, entitled GRADIENT ANTENNA COILS AND ARRAYS FOR USE IN LOCATING SYSTEM; U.S. Pat. No. 9,494,706, issued Nov. 15, 2016, entitled OMNI-INDUCER TRANSMITTING DEVICES AND METHODS; U.S. patent application Ser. No. 15/360,979, Nov. 23, 2016, entitled UTILITY LOCATING SYSTEMS, DEVICES, AND METHODS USING RADIO BROADCAST SIGNALS; U.S. Pat. No. 9,521,303, issued Dec. 13, 2016, entitled CABLE STORAGE DRUM WITH MOVEABLE CCU DOCKING APPARATUS; U.S. Pat. No. 9,523,788, issued Dec. 20, 2016, entitled MAGNETIC SENSING BURIED OBJECT LOCATOR INCLUDING A CAMERA; U.S. Pat. No. 9,571,326, issued Feb. 14, 2017, entitled METHOD AND APPARATUS FOR HIGH-SPEED DATA TRANSFER EMPLOYING SELF-SYNCHRONIZING QUADRATURE AMPLITUDE MODULATION (QAM); U.S. patent application Ser. No. 15/457,149, Mar. 13, 2017, entitled USER INTERFACES FOR UTILITY LOCATORS; U.S. patent application Ser. No. 15/457,222, Mar. 13, 2017, entitled SYSTEMS AND METHODS FOR LOCATING BURIED OR HIDDEN OBJECTS USING SHEET CURRENT FLOW MODELS; U.S. Pat. No. 9,599,740, issued Mar. 21, 2017, entitled USER INTERFACES FOR UTILITY LOCATORS; U.S. Pat. No. 9,599,449, issued Mar. 21, 2017, entitled SYSTEMS AND METHODS FOR LOCATING BURIED OR HIDDEN OBJECTS USING SHEET CURRENT FLOW MODELS; U.S. patent application Ser. No. 15/470,642, Mar. 27, 2017, entitled UTILITY LOCATING APPARATUS AND SYSTEMS USING MULTIPLE ANTENNA COILS; U.S. patent application Ser. No. 15/470,713, Mar. 27, 2017, entitled UTILITY LOCATORS WITH PERSONAL COMMUNICATION DEVICE USER INTERFACES; U.S. Pat. No. 9,625,602, issued Apr. 18, 2017, entitled SMART PERSONAL COMMUNICATION DEVICES AS USER INTERFACES; U.S. patent application Ser. No. 15/497,040, Apr. 25, 2017, entitled SYSTEMS AND METHODS FOR LOCATING AND/OR MAPPING BURIED UTILITIES USING VEHICLE-MOUNTED LOCATING DEVICES; U.S. Pat. No. 9,632,199, issued Apr. 25, 2017, entitled INDUCTIVE CLAMP DEVICES, SYSTEMS, AND METHODS; U.S. Pat. No. 9,632,202, issued Apr. 25, 2017, entitled ECONOMICAL MAGNETIC LOCATOR APPARATUS AND METHOD; U.S. Pat. No. 9,634,878, issued Apr. 25, 2017, entitled SYSTEMS AND METHODS FOR DATA SYNCHRONIZING QUADRATURE AMPLITUDE MODULATION (QAM); U.S. Pat. No. 9,638,824, issued May 2, 2017, entitled QUAD-GRADIENT COILS FOR USE IN LOCATING SYSTEMS; U.S. patent application Ser. No. 15/590,964, May 9, 2017, entitled BORING INSPECTION SYSTEMS AND METHODS; U.S. Pat. No. 9,651,711, issued May 16, 2017, entitled HORIZONTAL BORING INSPECTION DEVICE AND METHODS; U.S. patent application Ser. No. 15/626,399, Jun. 19, 2017, entitled SYSTEMS AND METHODS FOR UNIQUELY IDENTIFYING BURIED UTILITIES IN A MULTI-UTILITY ENVIRONMENT; U.S. Pat. No. 9,684,090, issued Jun. 20, 2017, entitled NULLED-SIGNAL LOCATING DEVICES, SYSTEMS, AND METHODS; U.S. Pat. No. 9,696,447, issued Jul. 4, 2017, entitled BURIED OBJECT METHODS AND APPARATUS USING MULTIPLE ELECTROMAGNETIC SIGNALS; U.S. Pat. No. 9,696,448, issued Jul. 4, 2017, entitled GROUND-TRACKING DEVICES FOR USE WITH A MAPPING LOCATOR; U.S. patent application Ser. No. 15/670,845, Aug. 7, 2017, entitled HIGH FREQUENCY AC-POWERED DRAIN CLEANING AND INSPECTION APPARATUS AND METHODS; U.S. patent application Ser. No. 15/681,250, Aug. 18, 2017, entitled ELECTTRONIC MARKER DEVICES AND SYSTEMS; U.S. patent application Ser. No. 15/681,409, filed Aug. 20, 2017, entitled WIRELESS BURIED PIPE AND CABLE LOCATING SYSTEMS; U.S. Pat. No. 9,746,572, issued Aug. 29, 2017, entitled ELECTRONIC MARKER DEVICES AND SYSTEMS; U.S. Pat. No. 9,746,573, issued Aug. 29, 2017, entitled WIRELESS BURIED PIPE AND CABLE LOCATING SYSTEMS; U.S. Pat. No. 9,769,366, issued Sep. 19, 2017, entitled SELF-GROUNDING TRANSMITTING PORTABLE CAMERA CONTROLLER FOR USE WITH PIPE INSPECTION SYSTEMS; U.S. Pat. No. 9,784,837, issued Oct. 10, 2017, entitled OPTICAL GROUND TRACKING APPARATUS, SYSTEMS, AND METHODS; U.S. patent application Ser. No. 15/785,330, Oct. 16, 2017, entitled SYSTEMS AND METHODS OF USING A SONDE DEVICE WITH A SECTIONAL FERRITE CORE STRUCTURE; U.S. Pat. No. 9,791,382, issued Oct. 17, 2017, entitled PIPE INSPECTION SYSTEM WITH JET- TER PUSH-CABLE; U.S. Pat. No. 9,798,033, issued Oct. 24, 2017, entitled SONDE DEVICES INCLUDING A SECTIONAL FERRITE CORE; U.S. patent application Ser. No. 15/805,007, filed Nov. 6, 2017, entitled PIPE INSPECTION SYSTEM CAMERA HEADS; U.S. patent application Ser. No. 15/806,219, Nov. 7, 2017, entitled MULTI-CAMERA PIPE INSPECTION APPARATUS, SYSTEMS AND METHODS; U.S. patent application Ser. No. 15/811,361, Nov. 13, 2017, entitled OPTICAL GROUND TRACKING APPARATUS, SYSTEMS, AND METHODS; U.S. Pat. No. 9,824,433, issued Nov. 21, 2017, entitled PIPE INSPECTION SYSTEM CAMERA HEADS; U.S. Pat. No. 9,829,783, issued Nov. 28, 2017, entitled SPRING ASSEMBLIES WITH VARIABLE FLEXIBILITY FOR USE WITH PUSH-CABLES AND PIPE INSPECTION SYSTEMS; U.S. Pat. No. 9,835,564, issued Dec. 5, 2017, entitled MULTI-CAMERA PIPE INSPECTION APPARATUS, SYSTEMS, AND METHODS; U.S. Pat. No. 9,841,503, issued Dec. 12, 2017, entitled OPTICAL GROUND TRACKING APPARATUS, SYSTEMS, AND METHODS; U.S. patent application Ser. No. 15/846,102, Dec. 18, 2017, entitled SYSTEMS AND METHODS FOR ELECTRONICALLY MARKING, LOCATING, AND VIRTUALLY DISPLAYING BURIED UTILITIES; U.S. patent application Ser. No. 15/866,360, Jan. 9, 2018, entitled TRACKED DISTANCE MEASURING DEVICE, SYSTEMS, AND METHODS; U.S. patent application Ser. No. 15/870,787, Jan. 12, 2018, entitled MAGNETIC FIELD CANCELING AUDIO SPEAKERS FOR USE WITH BURIED UTILITY LOCATORS OR OTHER DEVICES; U.S. Provisional Patent Application 62/620,959, Jan. 23, 2018, entitled RECHARGEABLE BATTERY PACK ONBOARD CHARGE STATE INDICATION METHODS AND APPARATUS; U.S. Pat. No. 9,880,309, issued Jan. 30, 2018, entitled UTILITY LOCATOR TRANSMITTER APPARATUS AND METHODS; U.S. patent application Ser. No. 15/889,067, Feb. 5, 2018, entitled UTILITY LOCATOR TRANSMITTER DEVICES, SYSTEMS, AND METHODS WITH DOCKABLE APPARATUS; U.S. Pat. No. 9,891,337, issued Feb. 13, 2018, entitled UTILITY LOCATOR TRANSMITTER DEVICES, SYSTEMS, AND METHODS WITH DOCKABLE APPARATUS; U.S. patent application Ser. No. 15/919,077, Mar. 12, 2018, entitled PORTABLE PIPE INSPECTION SYSTEMS AND METHODS; U.S. Pat. No. 9,914,157, issued Mar. 13, 2018, entitled METHODS AND APPARATUS FOR CLEARING OBSTRUCTIONS WITH A JETTER PUSH-CABLE APPARATUS; U.S. patent application Ser. No. 15/922,703, Mar. 15, 2018, entitled SELF-LEVELING INSPECTION SYSTEMS AND METHODS; U.S. patent application Ser. No. 15/925,643, Mar. 19, 2018, entitled PHASE-SYNCHRONIZED BURIED OBJECT TRANSMITTER AND LOCATOR METHODS AND APPARATUS; U.S. patent application Ser. No. 15/925,671, Mar. 19, 2018, entitled MULTI-FREQUENCY LOCATING SYSTEMS AND METHODS; U.S. Pat. No. 9,924,139, issued Mar. 20, 2018, entitled PORTABLE PIPE INSPECTION SYSTEMS AND APPARATUS; U.S. patent application Ser. No. 15/936,250, Mar. 26, 2018, entitled GROUND TRACKING APPARATUS, SYSTEMS, AND METHODS; U.S. Pat. No. 9,927,368, issued Mar. 27, 2018, entitled SELF-LEVELING INSPECTION SYSTEMS AND METHODS; U.S. Pat. No. 9,927,545, issued Mar. 27, 2018, entitled MULTI-FREQUENCY LOCATING SYSTEM AND METHODS; U.S. Pat. No. 9,928,613, issued Mar. 27, 2018, entitled GROUND TRACKING APPARATUS, SYSTEMS, AND METHODS; U.S. Provisional Patent Application 62/656,259, Apr. 11, 2018, entitled GEOGRAPHIC MAP UPDATING METHODS AND SYSTEMS; U.S. patent application Ser. No. 15/954,486, filed Apr. 16, 2018, entitled UTILITY LOCATOR APPARATUS, SYSTEMS, AND METHODS; U.S. Pat. No. 9,945,976, issued Apr. 17, 2018, entitled UTILITY LOCATOR APPARATUS, SYSTEMS, AND METHODS; U.S. patent application Ser. No. 15/960,340, Apr. 23, 2018, entitled METHODS AND SYSTEMS FOR GENERATING INTERACTIVE MAPPING DISPLAYS IN CONJUNCTION WITH USER INTERFACE DEVICES; U.S. Pat. No. 9,959,641, issued May 1, 2018, entitled METHODS AND SYSTEMS FOR SEAMLESS TRANSITIONING IN INTERACTIVE MAPPING SYSTEMS; U.S. Provisional Patent Application 62/686,589, filed Jun. 18, 2018, entitled MULTI-DIELECTRIC COAXIAL PUSH-CABLES; U.S. Pat. No. 10,001,425, issued Jun. 19, 2018, entitled PORTABLE CAMERA CONTROLLER PLATFORM FOR USE WITH PIPE INSPECTION SYSTEM; U.S. Provisional Patent Application 62/688,259, filed Jun. 21, 2018, entitled ACTIVE MARKER DEVICES FOR UNDERGROUND USE; U.S. Pat. No. 10,009,519, issued Jun. 26, 2018, entitled SELF-LEVELING CAMERA HEAD; U.S. Pat. No. 10,009,582, issued Jun. 26, 2018, entitled PIPE INSPECTION SYSTEM WITH REPLACEABLE CABLE STORAGE DRUM; U.S. Pat. No. 10,027,526, issued Jul. 17, 2018, entitled METHOD AND APPARATUS FOR HIGH-SPEED DATA TRANSFER EMPLOYING SELF-SYNCHRONIZING QUADRATURE AMPLITUDE MODULATION (QAM); U.S. Pat. No. 10,024,366, issued Jul. 17, 2018, entitled ASSYMETRIC DRAG FORCE BEARING; U.S. Pat. No. 10,031,253, issued Jul. 24, 2018, entitled GRADIENT ANTENNA COILS AND ARRAYS FOR USE IN LOCATING SYSTEMS; U.S. Pat. No. 10,042,072, issued Aug. 7, 2018, entitled OMNI-INDUCER TRANSMITTING DEVICES AND METHODS; U.S. Pat. No. 10,069,667, issued Sep. 4, 2018, entitled SYSTEMS AND METHODS FOR DATA TRANSFER USING SELF-SYNCHRONIZING QUADRATURE AMPLITUDE MODULATION (QAM); U.S. Provisional Patent Application 62/726,500, filed Sep. 4, 2018, entitled VIDEO PIPE INSPECTION SYSTEMS, DEVICES, AND METHODS INTEGRATED WITH NON-VIDEO DATA RECORDING AND COMMUNICATION FUNCTIONALITY; U.S. Pat. No. 10,082,599, issued Sep. 5, 2018, entitled MAGNETIC SENSING BURIED OBJECT LOCATOR INCLUDING A CAMERA; U.S. Pat. No. 10,073,186, Sep. 11, 2018, entitled KEYED CURRENT SIGNAL UTILITY LOCATING SYSTEMS AND METHODS; U.S. Pat. No. 10,078,149, issued Sep. 18, 2018, entitled BURIED OBJECT LOCATORS WITH DODECAHEDRAL ANTENNA NODES; U.S. Pat. No. 10,082,591, issued Sep. 25, 2018, entitled MAGNETIC UTILITY LOCAOTR DEVICES AND METHODS; U.S. Pat. No. 10,084,945, issued Sep. 25, 2018, entitled CABLE STORAGE DRUM WITH MOVABLE CCU DOCKING APPARATUS; U.S. patent application Ser. No. 16/144,878, filed Sep. 27, 2018, entitled MULTIFUNCTION BURIED UTILITY LOCATING CLIPS; U.S. Pat. No. 10,088,592, Oct. 2, 2018, entitled INDUCTIVE CLAMP DEVICES, SYSTEMS, AND METHODS; U.S. Pat. No. 10,090,498, Oct. 2, 2018, entitled MODULAR BATTERY PACK APPARATUS, SYSTEMS, AND METHODS INCLUDING VIRAL DATA AND/OR CODE TRANSFER; U.S. Pat. No. 10,100,507, issued Oct. 16, 2018, entitled PIPE CLEARING CABLES AND APPARATUS; U.S. Pat. No. 10,105,723, Oct. 23, 2018, entitled TRACKABLE DIPOLE DEVICES, METHODS, AND SYSTEMS FOR USE WITH MARKING PAINT STICKS; U.S. patent application Ser. No.

16/178,494, filed Nov. 1, 2018, entitled THREE-AXIS MEASUREMENT MODULES AND SENSING METHODS; U.S. Provisional Patent Application 62/756,538, filed Nov. 6, 2018, entitled ROBUST AND LOW COST IMPEDANCE CONTROLLED SLIP RINGS; U.S. Provisional Patent Application 62/768,760, filed Nov. 16, 2018, entitled PIPE INSPECTION AND/OR MAPPING CAMERA HEADS, SYSTEMS, AND METHODS; U.S. Provisional Patent Application 62/777,045, filed Dec. 7, 2018, entitled MAP GENERATION BASED ON UTILITY LINE POSITION AND ORIENTATION ESTIMATES; U.S. Pat. No. 10,162,074, issued Dec. 25, 2018, entitled UTILITY LOCATORS WITH RETRACTABLE SUPPORT STRUCTURES AND APPLICATIONS THEREOF; U.S. Pat. No. 10,171,712, issued Jan. 1, 2019, entitled THERMAL EXTRACTION ARCHITECTURES FOR CAMERA AND LIGHTING DEVICES; U.S. Pat. No. 10,171,721, Jan. 1, 2019, entitled PIPE INSPETION SYSTEMS WITH SELF-GROUNDING PORTABLE CAMERA CONTROLLER; U.S. Provisional Patent Application 62/794,863, filed Jan. 21, 2019, entitled HEAT EXTRACTION ARCHITECTURE FOR COMPACT VIDEO HEADS; U.S. Provisional Patent Application 62/824,937, filed Mar. 27, 2019, entitled LOW COST AND HIGH PERFORMANCE SIGNAL PROCESSING IN A BURIED OBJECT LOCATOR SYSTEM; U.S. Pat. No. 10,247,845, issued Apr. 2, 2019, entitled UTILITY LOCATOR TRANSMITTER APPARATUS AND METHODS; U.S. patent application Ser. No. 16/382,136, filed Apr. 11, 2019, entitled GEOGRAPHIC MAP UPDATING METHODS AND SYSTEMS; U.S. Pat. No. 10,274,632, issued Apr. 30, 2019, entitled UTILITY LOCATING SYSTEMS WITH MOBILE BASE STATION; U.S. Pat. No. 10,288,997, issued May 14, 2019, entitled ROTATING CONTACT ASSEMBLIES FOR SELF-LEVELING CAMERA HEADS; U.S. Pat. No. 10,324,188, issued Jun. 18, 2019, entitled OPTICAL GROUND TRACKING APPARATUS, SYSTEMS, AND METHODS FOR USE WITH BURIED UTILITY LOCATORS; U.S. Pat. No. 10,356,360, issued Jul. 16, 2019, entitled HIGH BANDWIDTH VIDEO PUSH-CABLES FOR PIPE INSPECTION SYSTEMS; U.S. Pat. No. 10,353,103, issued Jul. 16, 2019, entitled SELF-STANDING MULTI-LEG ATTACHMENT DEVICES FOR USE WITH UTILITY LOCATORS; U.S. Pat. No. 10,359,368, Jul. 23, 2019, entitled PIPE INSPECTION SYSTEM WITH JETTER PUSH-CABLE; U.S. Pat. No. 10,371,305, issued Aug. 6, 2019, entitled DOCKABLE TRIPODAL CAMERA CONTROL UNIT; and U.S. Pat. No. 10,379,436, Aug. 13, 2019, entitled SPRING ASSEMBLIES WITH VARIABLE FELXIBILITY FOR USE WITH PUSH-CABLES AND PIPE INSPECTION SYSTEMS. The content of each of these patents and applications is incorporated by reference herein in its entirety.

As used herein, the term "in-pipe" may refer to anything detectable at the location of the camera head. For instance, the terms "in-pipe noise", "in-pipe audio data", and "in-pipe" audio signature" may refer to sound detected at a microphone or other acoustic/audio sensor inside the camera head generally as the camera head is disposed inside a pipe during normal usage.

The term "non-video" as used in "non-video data" or "non-video related sensors" may general relate to aspects of the camera head or inspection not relating to the image sensor(s) or video or images generated therefrom. Such aspects may generally refer to sensors or data generated in the camera head not directly relating to the video such as audio/acoustic signals, temperate sensors and signals, pressure, humidity, water characteristics, non-imaging light signals at visible and/or non-visible wavelength, accelerometers or other positioning sensors, magnetometers, and/or other physical property sensors and the like.

The term "display and user input element" may refer to any device for displaying the video and/or non-video data that may be generated as well as accepting user input to generate commands that may be communicated to the camera head and/or other devices in the pipe inspection system. "User input" may refer to input explicitly input by the user or implicitly input such as a biometric scan. "User input" may further refer to input from any of the various system sensors. Exemplary display and user input element may include, but should not be limited to, smart phones, tablets, laptop computers, or other electronic computing devices that may be connected via a wire or wireless connection. Such devices may likewise be referred to herein as "computing devices".

The term "data link" as used in "data link receiver" or "data link signal" may relate to data transmitted from a CCU or other display and user input element to a camera head for purposes of communicating and controlling aspects of the camera head, video signal, and non-video data.

The term "out of band" in reference to data link and video signals as described herein may refer to signals occurring in different intervals in the frequency spectrum. For instance, the data link signal may be out of band to the analog video signal transmitted along the same transmission line. In this usage, the "out of band" data link signal may use a frequency above the highest component of the analog video signal. More generally, "out of band" may refer to any technique to establish bi-directional communication between the camera head and CCU (e.g., time-division multiplexing or like technique).

The following exemplary embodiments are provided for the purpose of illustrating examples of various aspects, details, and functions of the present disclosure; however, the described embodiments are not intended to be in any way limiting. It will be apparent to one of ordinary skill in the art that various aspects may be implemented in other embodiments within the spirit and scope of the present disclosure. As used herein, the term, "exemplary" means "serving as an example, instance, or illustration." Any aspect, detail, function, implementation, and/or embodiment described herein as "exemplary" is not necessarily to be construed as preferred or advantageous over other aspects and/or embodiments.

Various additional aspects, features, devices, systems, and functionality are further described below in conjunction with the appended Drawings.

Example Video Inspection Systems, Devices, and Methods Embodiments

FIG. 1 illustrates an inspection system embodiment 100 in accordance with aspects of the present disclosure. Inspection system 100 may include a camera head 110 coupled to a push-cable 130, allowing the camera head 110 to be pushed into a pipe 140 and/or other conduit or void by a user 150 or via user-controlled or automated mechanical force. The push-cable 130 may be a push-cable as described in, for example, the following co-assigned patents and patent applications: U.S. Pat. No. 5,457,288, issued Oct. 10, 1995, entitled Dual Push-Cable for Pipe Inspection; U.S. Pat. No. 5,808,239, issued Sep. 15, 1998, entitled Video Push-Cable; U.S. Pat. No. 5,939,679, issued Aug. 17, 1999, entitled Video Push-Cable; U.S. Pat. No. 8,589,948, issued Mar. 24, 2015, entitled Light Weight Sewer Cable; and U.S. Pat. No.

9,448,376, issued Sep. 20, 2016, entitled High Bandwidth Push-Cables for Pipe Inspection Systems. The content of each of these applications is incorporated by reference herein in its entirety. A push-cable spring 160 may further couple between the push-cable 130 and camera head 110. The spring 160 may be used to further improve movement and/or handling of the camera head 110 into and within the pipe 140 or other void. The push-cable spring 160 may be of the variety described in, for example, co-assigned U.S. Pat. No. 9,477,147, issued Oct. 25, 2016, entitled Spring Assemblies with Variable Flexibility for use with Push-Cables and Pipe Inspection Systems, the content of which is incorporated by reference herein in its entirety.

A cable reel 170 or other apparatus for dispensing push-cable 130, and a display and user input element, such as camera control unit (CCU) 180, may further be coupled to a proximal end of the push-cable 130. The camera head 110 may be coupled to a distal end of the push-cable 130. The cable reel 170 may be a reel/cable storage drum as described, for example, in co-assigned patents and patent applications including: U.S. Pat. No. 6,958,767, issued Oct. 25, 2005, entitled Video Pipe Inspection System Employing Non-Rotating Cable Storage Drum; U.S. patent application Ser. No. 13/826,112, filed Mar. 14, 2013, entitled Systems and Methods Involving a Smart Cable Storage Drum and Network Node for Transmission of Data; U.S. patent application Ser. No. 14/216,358, filed Mar. 17, 2014, entitled Systems and Methods Involving a Smart Cable Storage Drum and Network Node and Methods; U.S. Pat. No. 9,521,303, issued Dec. 13, 2016, entitled Cable Storage Drum with Moveable CCU Docking Apparatus; and/or U.S. Pat. No. 10,009,582, issued Jun. 26, 2018, entitled Pipe Inspection System with Replaceable Cable Storage Drum. The content of each of these applications is incorporated by reference herein in its entirety.

The cable reel 170 and or other system device may further include an element for measuring the amount of cable dispensed (e.g., a cable or distance counter), such as those described in, for example, co-assigned U.S. patent application Ser. No. 14/203,485, filed Mar. 10, 2014, entitled Pipe Inspection Cable Counter and Overlay Management System, and/or U.S. Pat. No. 8,970,211, issued Mar. 3, 2015, entitled Pipe Inspection Cable Counter and Overlay Management System. The content of each of these applications is incorporated by reference herein in its entirety.

The CCU 180 and/or other display and user input elements or systems may display images, video, and/or data provided from the camera head (or other multi-imaging module device or system). The CCU 180 may further control operation of the camera head, displayed images/video, and/or other devices within the inspection system. The CCU 180 may, for example, be a device as described in co-assigned U.S. Pat. No. 9,769,366, issued Sep. 19, 2017, entitled Self-Grounding Transmitting Portable Camera Controller for Use with Pipe Inspection Systems. The content of each of which is incorporated by reference herein in its entirety. In some embodiments, the display and user input element may be a computing device or system such as a laptop computer, smart phone, tablet computer, a utility locator device and/or other devices or systems for displaying and/or controlling operation of the camera head, or controlling image or video display parameters such as perspective within received images/video, lighting controls, resolution controls, articulation controls and the like.

The push-cable 130 may include internal cabling for providing electrical power to camera head 110 as well as communication of data such as images, video, sensor data, and the like between the camera head 110 and CCU 180 and/or other system devices. In some embodiments communication of data may be done fully or partially via wireless communication rather than via internal metallic or optical cabling. In some embodiments, electrical power may be provided by one or more batteries (not illustrated) that may be coupled to the cable reel 170 and/or CCU 180. The batteries may, for example, be smart batteries such as those described in co-assigned U.S. Pat. No. 10,090,498, issued Oct. 2, 2018, entitled Modular Battery Pack Apparatus, Systems, and Methods. The content of which is incorporated by reference herein in its entirety.

An inspection system embodiment in accordance with aspects of the present disclosure may include various additional devices that are not explicitly illustrated. For example, a camera head and/or push-cable may be equipped with an electromagnetic sonde device (e.g., sondes 225 or 235 of FIG. 2) for generating a dipole magnetic field from within a pipe or other cavity, which may then be detected by a buried utility locator to determine the position of the electromagnetic sonde (below the ground) at the ground surface. The sonde device may, for example, be a sonde such as those described in co-assigned patents and patent applications including: U.S. Pat. No. 7,221,136, issued May 22, 2007, entitled Sondes for Locating Underground Pipes and Conduits; U.S. Pat. No. 7,298,126, issued Nov. 20, 2007, entitled Sondes for Locating Underground Pipes and Conduits; U.S. Pat. No. 7,863,885, issued Jan. 4, 2011, entitled Sondes for Locating Underground Pipes and Conduits; U.S. patent application Ser. No. 14/027,027, filed Sep. 13, 2013, entitled Sonde Devices Including a Sectional Ferrite Core Structure; and/or U.S. Pat. No. 9,798,033, issued Oct. 24, 2017, entitled Sonde Devices Including a Sectional Ferrite Core Structure. The content of each of these applications is incorporated by reference herein in its entirety.

The inspection system 100 may include a utility locator device 190 that may be used to determine and/or map the location of pipes buried within the ground including pipe locations correlating with video or still images and associated pipe data generated at the camera head 110. In some such system embodiments, a utility locator device such as the utility locator device 190 may further be configured to receive image or video data and/or other data or information generated at the camera head, such as via a wireless data connection, and display and/or store images/video from the pipe inspection as transmitted via wireless data connection between the utility locator and CCU or utility locator and reel. In some system embodiments, such data may be communicated via a wired connection indirectly coupling the camera head and the locator. The utility locator device 190 may include a processing element for processing and combining locate data, location/position data, and/or images or video from the camera head. The locate data could be combined using synchronization form a common time base. Such a common time base could be achieved through GPS or synchronization of clocks by other means such as optical, audio, or electromagnetic synchronization pulses between system devices. The wireless communication module may, for example, be a Bluetooth or Wi-Fi communication module, a cellular data communication module, or other wireless communication modules. In some embodiments, the utility locator device 190 may further be configured to control operational parameters of the camera head 110 and/or other system devices such as the CCU 180 and cable reel 170.

Details of example utility locator devices as may be used in combination with the disclosures herein in various system embodiments are described in co-assigned patents and patent applications including: U.S. Pat. No. 7,009,399, issued Mar. 7, 2006, entitled Omnidirectional Sonde and Line Locator; U.S. Pat. No. 7,276,910, issued Oct. 2, 2007, entitled A Compact Self-Tuned Electrical Resonator for Buried Object Locator Applications; U.S. Pat. No. 7,288,929, issued Oct. 30, 2007, entitled Inductive Clamp for Applying Signal to Buried Utilities; U.S. Pat. No. 7,443,154, issued Oct. 28, 2008, entitled Multi-Sensor Mapping Omnidirectional Sonde and Line Locator; U.S. Pat. No. 7,518,374, issued Apr. 14, 2009, entitled Reconfigurable Portable Locator Employing Multiple Sensor Array Having Flexible Nested Orthogonal Antennas; U.S. Pat. No. 7,619,516, issued Nov. 17, 2009, entitled Single and Multi-Trace Omnidirectional Sonde and Line Locators and Transmitters Used Therewith; U.S. Pat. No. 7,825,647, issued Nov. 2, 2010, entitled Compact Line Illuminator for Locating Buried Pipes and Cables; U.S. Pat. No. 7,990,151, issued Aug. 2, 2011, entitled Tri-Pod Buried Locator System; U.S. patent application Ser. No. 13/469,024, filed May 10, 2012, entitled Buried Object Locator Apparatus and Systems; U.S. Pat. No. 8,248,056, issued Aug. 21, 2012, entitled A Buried Object Locator System Employing Automated Virtual Depth Event Detection and Signaling; U.S. Pat. No. 8,264,226, issued Sep. 11, 2012, entitled System and Method for Locating Buried Pipes and Cables with a Man Portable Locator and a Transmitter in a Mesh Network; U.S. Pat. No. 9,435,907, issued Sep. 6, 2016, entitled Phase-Synchronized Buried Object Locator Apparatus, Systems, and Methods; U.S. Pat. No. 9,638,824, issued May 2, 2017, entitled Quad-Gradient Coils for Use in a Locating System; U.S. patent application Ser. No. 13/851,951, filed Mar. 38, 2013, entitled Dual Antenna Systems with Variable Polarization; and/or U.S. Pat. No. 9,632,199, issued Apr. 25, 2017, entitled Inductive Clamp Devices, Systems, and Methods. The content of each of these applications is incorporated by reference herein in its entirety.

As disclosed in the various above-listed incorporated patents and patent applications, a utility locator device may include one or more location or position sensors such as global position system (GPS) sensors, inertial sensors, magnetic sensors and the like. Such sensors may be used to track and interpret motion vectors as the utility locator is moved about its operating surface and/or associate these with absolute position data such as latitude/longitude data or relative position data, such as data relating the position of the locator to reference surface features or objects. This data may be combined with images and/or video to generate combined position and mapping data, which may be associated, stored in a memory, transmitted to other electronic computing devices and systems and the like. As described subsequently herein, such mapping solution data may include data corresponding to location imagery as well as data collected through a pipe inspection by a camera head to reference a ground surface location via a utility locator device and/or other system tool. Pipe inspection imagery and data may be displayed upon the utility locator device display, stored in a memory, and/or transmitted to other devices and systems for archiving, mapping, analysis, and the like.

The inspection system 100 of FIG. 1 may further include one or more radios (e.g., cellular, Bluetooth, WIFI, ISM, and/or the like) disposed in the cable reel 170 and/or CCU 180 and/or utility locator device 190 and/or other system devices to communicate with one or more cloud servers such as cloud server 195. The cloud server 195, among other uses, may allow for authentication of a camera head in an inspection system as described with method 1500 of FIG. 15 and/or relating to the authentication of inspection data as described with method 1600 of FIG. 16A and method 1650 if FIG. 16B.

The inspection system 100 of FIG. 1 may further include one or more global navigation system satellite (GNSS) receivers which may be GPS receivers disposed in the cable reel 170 and/or CCU 180 and/or utility locator device 190 and/or other system devices to receive satellite navigation signals from a plurality of navigation satellites 196. Beyond determining locations of the various GNSS receiver laden devices, the received GPS or other navigation signals at the cable reel 170 and/or CCU 180 may be used to provide a 1 pulse-per-second (PPS) or other pulsed timing signal to an electromagnetic sonde, such as sonde 225 or sonde 235 illustrated in FIG. 2, allowing a signal broadcasted by the sonde to be phase synchronized with a receiving utility locator device, such as utility locator device 190 of FIG. 1. Further information regarding phase synchronized sondes may be found in method 1700 of FIG. 17.

Figure 2:
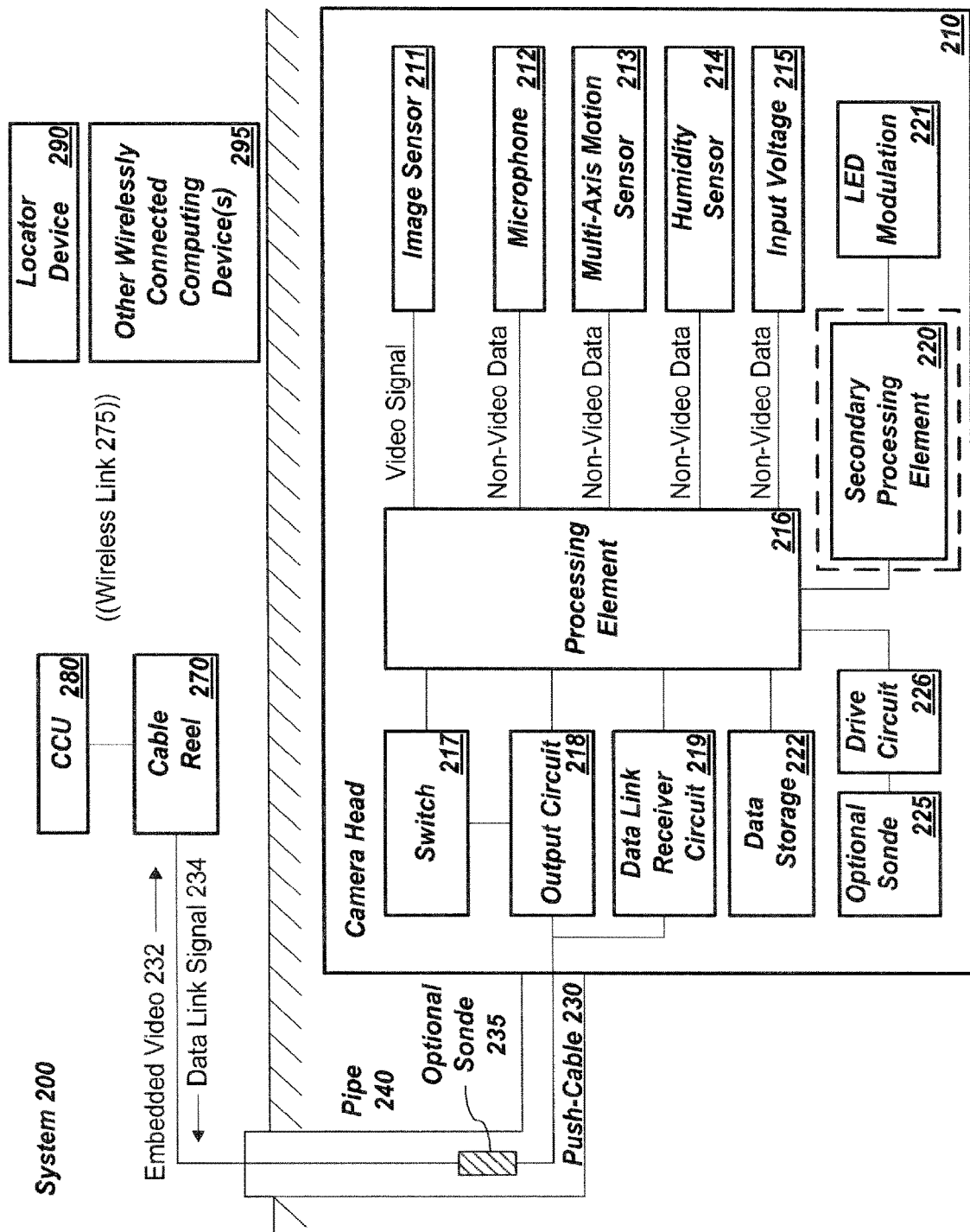
FIG. 2 is a system diagram of a pipe inspection system embodiment in accordance with certain aspects.

Turning to FIG. 2, a diagram of a pipe inspection system embodiment 200 in keeping with the present disclosure is illustrated which may be or share aspects with the system 100 of FIG. 1. System 200 may include a camera head 210 disposed on the distal end of a push-cable 230 that may be fed into a pipe 240 or like void or conduit for inspecting the interior of pipe 240. The push-cable 230 may be fed from a cable reel 270 further connected to a CCU 280. The system 200 may further include a locator device 290 that may be used to determine the location of pipe 240 and the location of the camera head 210 therein. A wireless link 275 may allow the exchange of data between the cable reel 270 and/or CCU 280 and the locator device 290 as well as the exchange of data between the cable reel 270 and/or CCU 280 and one or more other wirelessly connected computing devices 295. The computing device(s) 295 may be or include smart phones, laptop computers, and/or other like portable or non-portable computing devices. In some embodiments, such computing devices may include one or more remote servers.

The camera head 210 may include one or more image sensors 211 for generating video signal, which may include video and/or still images, corresponding to the interior of a pipe 240 as well as one or more non-video related sensors for generating non-video data. The one or more image sensors may, for example, be high dynamic range (HDR) imagers. The camera head 210 may be a self-leveling camera and may be or share aspects with the mechanical or digital self-leveling camera heads described in U.S. patent application Ser. No. 16/402,153, filed Dec. 20, 2012, entitled Rotating Contact Assemblies for Self-Leveling Camera Heads U.S. Pat. No. 8,587,648, issued Nov. 19, 2013, entitled Self-Leveling Camera Head; U.S. Pat. No. 9,277,105, issued Mar. 1, 2016, entitled Self-Leveling Camera Head; U.S. Pat. No. 9,927,368, issued Mar. 27, 2018, entitled Self-Leveling Inspection Systems and Methods; U.S. Pat. No. 10,009,519, issued Jun. 26, 2018, entitled Self-Leveling Camera Heads; U.S. Pat. No. 10,288,997, issued May 14, 2019, entitled Rotating Contact Assemblies for Self-Leveling Camera Heads; and U.S. patent application Ser. No. 15/922,703, filed Mar. 15, 2018, entitled Self-Leveling Inspection Systems and Methods. The content of each of these applications is incorporated by reference herein in its entirety.

Non-video related sensors of a camera head such as the camera head 210 includes at least a microphone 212 or other acoustic/audio sensor for generating acoustic data from inside pipe 240. Acoustic/audio data may be further used by the CCU 280, locator device 290, or other coupled computing device(s) 295 to determine pipe 240 materials in post processing. For instance, pipes of various materials may generate distinct audio signatures to a microphone or other acoustic sensor disposed inside of the pipe. Wavelengths sensed by the acoustic/audio sensor may include human audible wavelengths and/or infrasonic or ultrasonic wavelengths in alternate embodiments. Information about a material comprising the pipe may be determined by examining acoustic data generated by the microphone and determining a best match against a database of in-pipe acoustic signatures as relating to their associated pipe materials.

Figure 10:
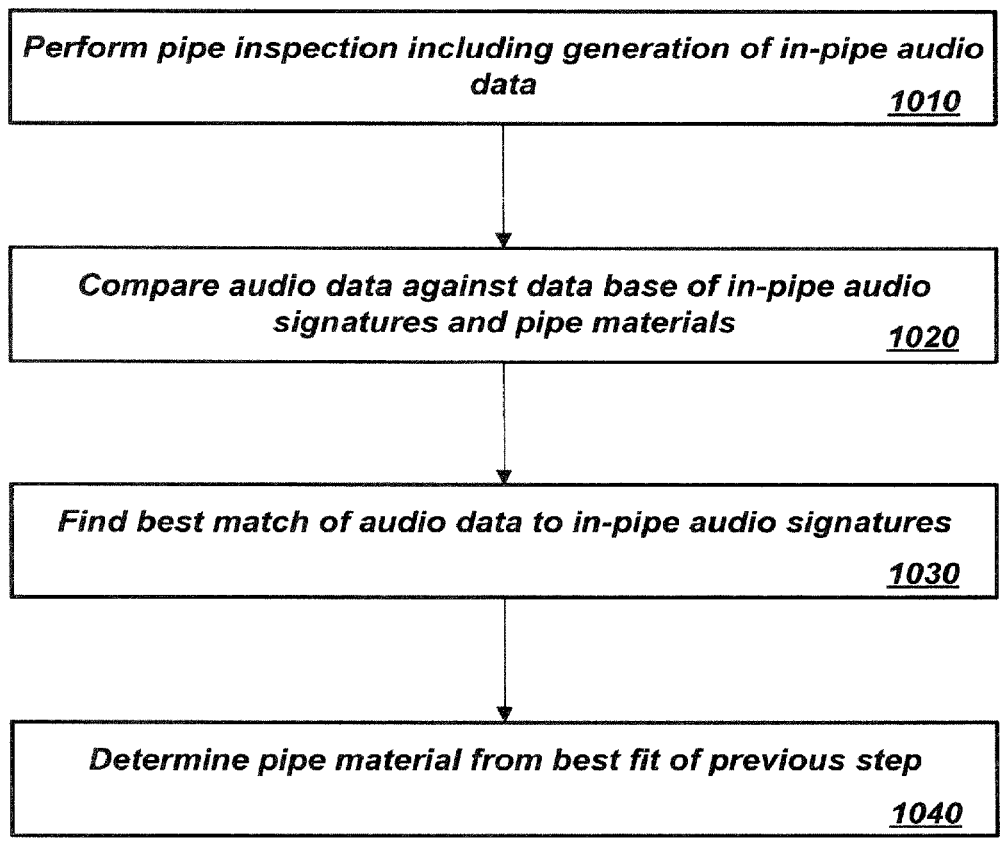
FIG. 10 is a method for determining pipe material from in-pipe audio data.

Further information regarding a method for determining pipe materials using in-pipe acoustic/audio data is described in method 1000 of FIG. 10. Referring back to FIG. 2, in at least one embodiment, the microphone 212 may be a 24 bit micro-electromechanical systems (MEMs) digital microphone or other like microphone wherein the gain control may be adjusted over a wide bit range.

The camera head 210 may include other non-video sensors such as those described previously and/or which may include one or more motion sensors such as multi-axis motion sensor 213 and humidity sensor 214 as well as other sensors. For example, some system and camera head embodiments (not illustrated) may further include laser, acoustic, and/or radar imaging and distance measuring devices. In system 200, sampling of input voltage 215 may occur at the camera head 210 and be used to determine the health of the connected push-cable 230. Further information regarding a method for determining push-cable health is described in method 1100 of FIG. 11. In some embodiments, the video signal may be adjusted at the camera head for compensating for frequency-dependent losses experienced by the push-cable. Further information regarding a method for compensating for frequency-dependent losses that may impact video signals sent to a CCU from a camera head is described in method 1200 of FIG. 12. The multi-axis motion sensor 213 may be or include accelerometers and/or nine axis motion processing sensors. In some embodiments, the multi-axis motion sensor 213 may be or include one or more six axis motion processing sensors and one or more separate magnetometers. In embodiments having both a microphone and a motion sensor inside the camera head, the gain control of the microphone may be configured to automatically adjust based on motion detected at the motion sensor(s). For instance, the movement of the camera head 210 inside pipe 240 may generate excess audio noise that may be compensated for by automatically lowering the gain at the microphone 212 or, in alternative embodiments, at the CCU or other display and user input element when the sound is being processed, played, and/or recorded. Further information regarding a method for compensating for microphone control based detected motion of a camera head is described in method 1300 of FIG. 13.

Non-video data generated at camera head 210 may be encoded and embedded in an analog video signal (embedded video 232) that may be further transmitted to CCU 280 and/or other devices such as locator device 290 and/or other computing device(s) 295. In some embodiments data may digitally encoded and/or transformed between analog and digital encoding formats.

For instance, the camera head 210 may include a processing element 216 for handling of video signal and non-video data which may include encoding of non-video data. The processing element 216 may further be coupled to a switch 217 that may switch on and off the image sensor 211 allowing non-video data to be interspersed into the video signal. The switch 217 may further couple to an output circuit 218 for transmitting the embedded video signal 232 to CCU 280 and/or other devices such as locator device 290 and/or other computing device(s) 295.

In some embodiments, the pipe inspection system in keeping with the present disclosure may include one or more optional electromagnetic sondes that may broadcast a signal or signals that may be received above the ground surface by one or more locator devices to determine the location of the sonde and thereby the location of the camera head. As illustrated in system 200 of FIG. 2, an optional electromagnetic sonde 235 may be disposed on or along push-cable 230. Likewise, an optional electromagnetic sonde 225 may be disposed in camera head 210 connected to a drive circuit 226 further connected to processing element 216. In the system 200, a 1 PPS or other pulsed timing signal may be generated by the cable reel 270 and/or CCU 280 from received GNSS signals (e.g., satellite navigation signals received from the navigation satellites 196 of FIG. 1). The GNSS signals may likewise be received at the locator device 290 such that the phase of the broadcasted electromagnetic sonde signal may be synchronized with the expected signal at the utility locator device. Additional details regarding phase synchronized sondes may be found in method 1700 of FIG. 17.

Figure 3A:
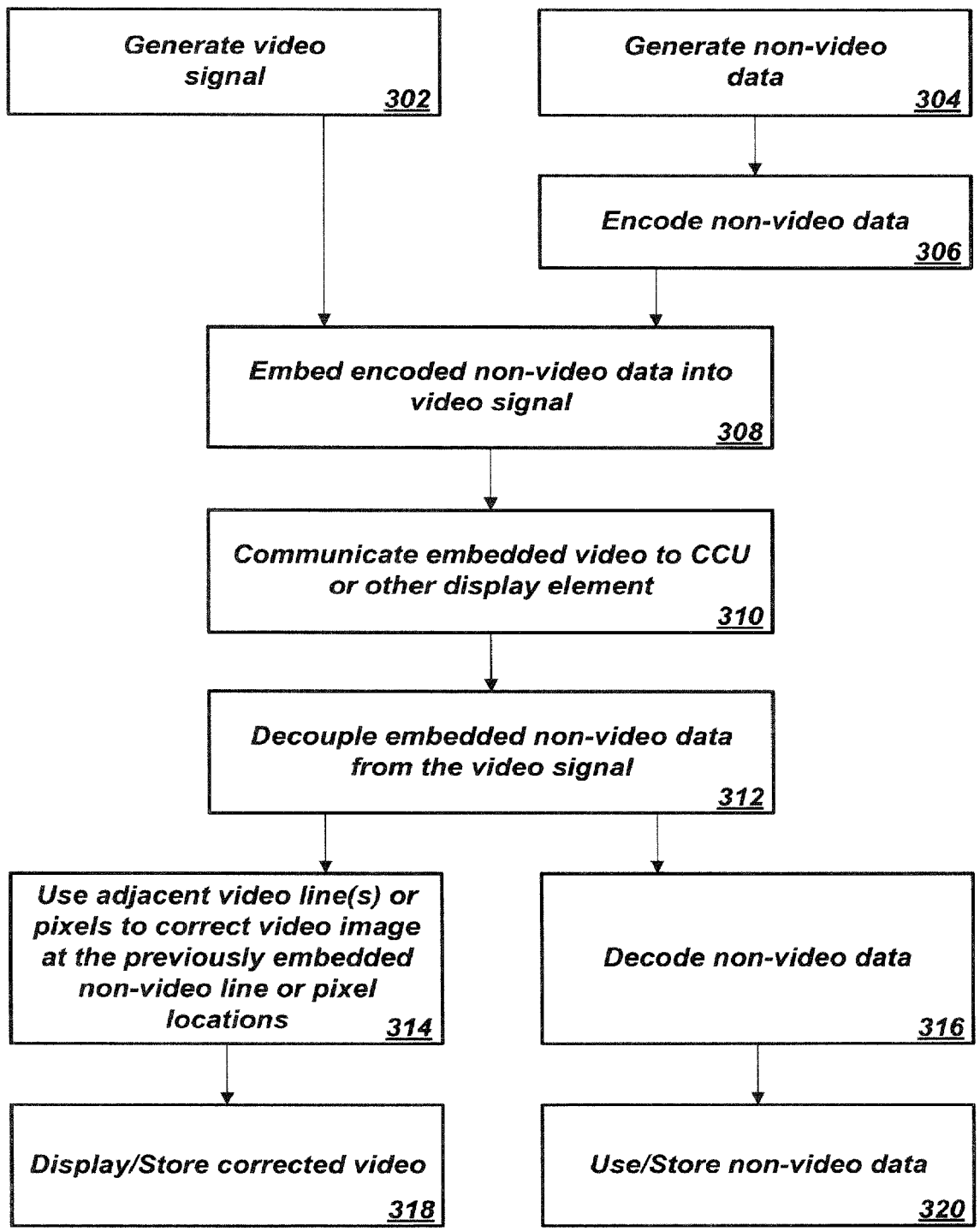
FIG. 3A is an embedded video signal method.

As described in the embedded video signal method 300 of FIG. 3A, a camera head may generate a video signal 302 concurrently or near concurrently with non-video data 304. Leading from step 304, the non-video data may be encoded in step 306. In some embodiments, such as step 356 of method 350 (FIG. 3B), encoding may include modulating the luminance of some number of pixels to create groupings of light or dark pixels. These groupings may be generated in a pattern to represent the non-video data. Likewise, encoding of non-video data embedded into the vertical blanking interval (VBI) may be achieved through modulation of other video signal aspects. Such patterns may further be known and decipherable at the CCU. In other embodiments, encoding of the non-video data may include modulating of colors or other pixel or pixel grouping characteristics. In a step 308, the encoded non-video data may be embedded into the video signal.

In some embodiments, such as with step 358 of method 350 (FIG. 3B), non-video data may be embedded into the active video frame. For instance, in some embodiments, the non-video data may be embedded in alternating lines or portions of alternating lines of an active interlaced video in a known or subsequently developed manner (e.g., adaptive based on an algorithm or driven by conditions) and/or in the VBI. In a step 310, the embedded video may be communicated to a CCU and/or other display and user input element such as a smart phone, laptop, or like computing device. In a step 312, the embedded non-video data may be decoupled from the video signal. In a step 314, a corrected video signal may be generated from adjacent video lines or pixels.

In some embodiments, such as step 364 of method 350 (FIG. 3B), adjacent lines or pixels may be copied and replaced over embedded non-video data lines/pixels. In other embodiments, the corrected video may be generated by averaging pixel luminance or color or other pixel aspect from contiguous pixels on adjacent video lines to each pixel location of the corrected lines. In a step 316 concurrent to step 314, the non-video data may be decoded. In some embodiments, decoding instructions may be communicated in the VBI data. In a step 318 from step 314, the corrected video may be displayed and or stored on a CCU or other display and user input element. In a step 320 leading from step 316 and concurrent to step 318, the decoded non-video data may be stored and or used. For instance, in at least one embodiment, audio data may reproduce in-pipe sounds at the CCU or other display and user input element allowing a user to listen to the sounds present at the camera position in the pipe in real time or near real time.

Figure 3B:
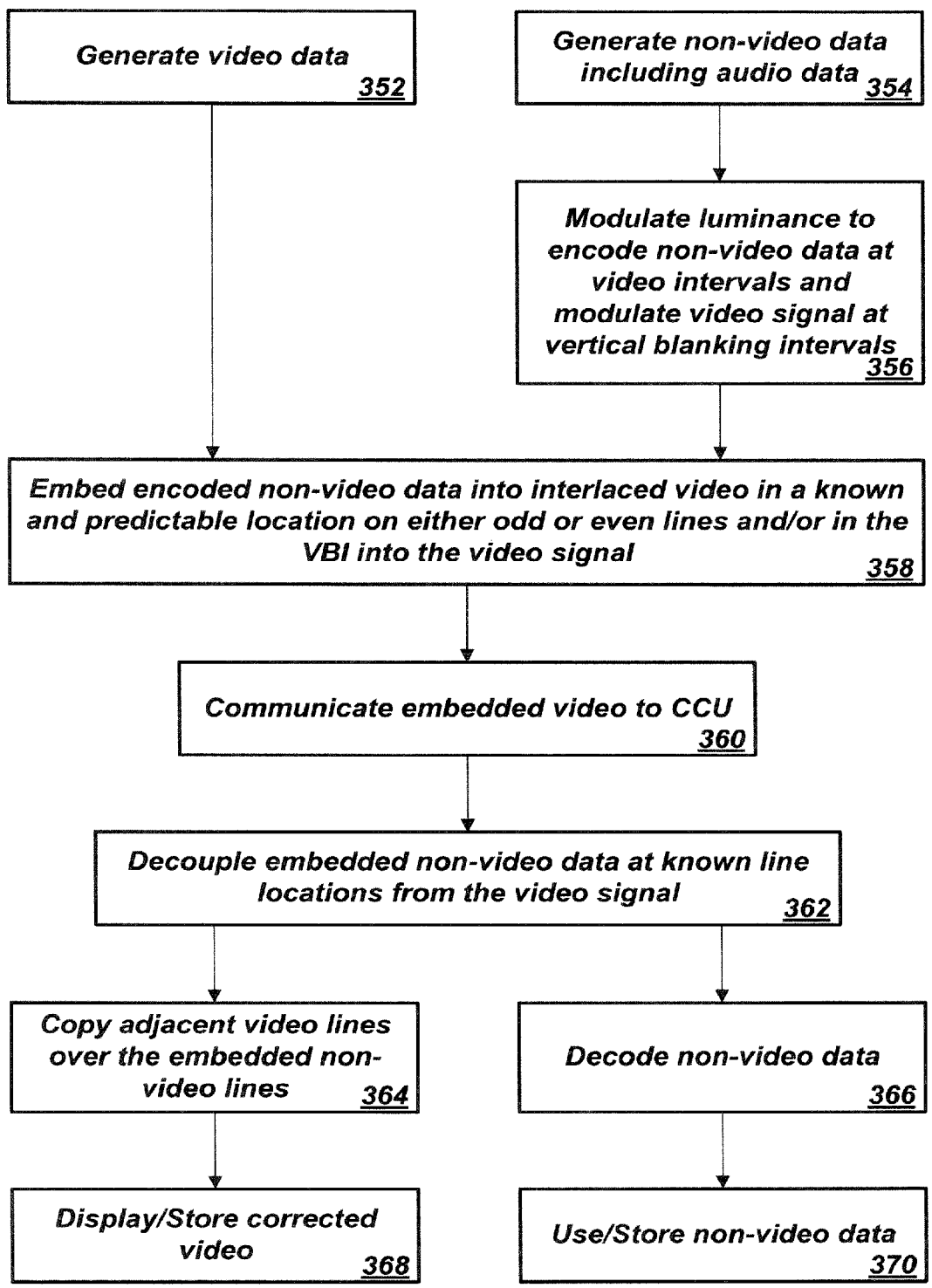
FIG. 3B is another embedded video signal method.

Turning to FIG. 3B, a specific embedded video signal method 350 may include a step 352 where a video signal is generated at a camera head concurrently or near concurrently with a step 354 where non-video data including in-pipe audio data is generated. Leading from step 354, the non-video data may be encoded in step 356 via modulating the luminance of some number of pixels to create groupings of light or dark pixels. These groupings may be generated in a pattern to represent the non-video data. Likewise, encoding of non-video data embedded into the vertical blanking interval (VBI) may be achieved through modulation of other video signal aspects. Such patterns may further be known and stored in memory so as to be decipherable at the CCU. In other embodiments, encoding of the non-video data may include modulating of colors or other pixel or pixel grouping characteristics. In a step 358, the encoded non-video data may be interspersed into alternating lines of the active video in a known manner and/or in the VBI. In a step 360, the embedded video may be communicated to a CCU. In a step 362, the embedded non-video data may be decoupled from the embedded video signal. In a step 364, a corrected video signal may be generated from adjacent video lines by adjacent video lines being copied and replacing embedded non-video data lines. In a step 366 concurrent with step 364, the non-video data may be decoded. In some embodiments, decoding instructions may be communicated in the VBI data. In a step 368 from step 364, the corrected video may be displayed and or stored on a CCU or other display and user input element. In a step 370 leading from step 366 and concurrent to step 368, the decoded non-video data may be stored and or used. For instance, in at least one embodiment, audio data may reproduce in-pipe sounds at the CCU or other display and user input element allowing a user to listen to the sounds present at the camera position in the pipe in real time or near real time.

In some method embodiments, the camera head may be digital self-leveling camera head such as those described in U.S. Pat. No. 9,080,992, issued Jul. 14, 2015, entitled Adjustable Variable Resolution Inspection Systems and Methods; U.S. patent application Ser. No. 15/927,703, filed Mar. 15, 2018, entitled Self-Leveling Inspection Systems and Methods; U.S. Pat. No. 9,927,368, issued Mar. 27, 2018, entitled Self-Leveling Inspection Systems and Methods; U.S. patent application Ser. No. 16/237,589, issued Dec. 31, 2018, entitled Adjustable Variable Resolution Inspection Systems and Methods; and U.S. Pat. No. 10,175,177, issued Jan. 8, 2019, entitled Adjustable Variable Resolution Inspection Systems and Methods. The content of each of these applications is incorporated by reference herein in its entirety.

Figure 3C:
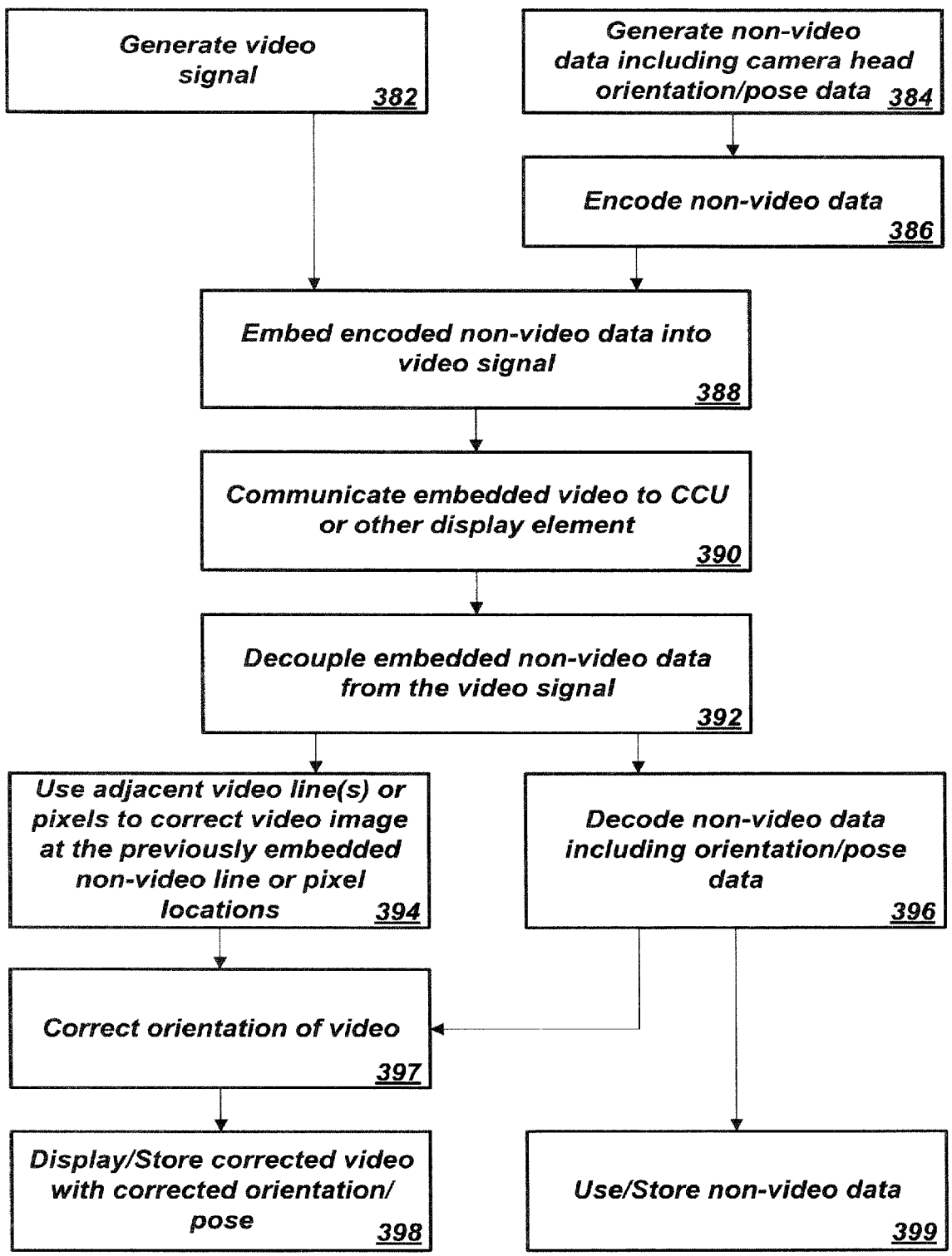
FIG. 3C is an embedded video signal method for use with a digital self-leveling camera

FIG. 3C illustrates an embedded video signal method 380 for use with a digital self-leveling camera. In the method 380, a digital-self leveling camera head may generate a video signal in step 382 concurrently or near concurrently with non-video data including camera head orientation/pose data in a step 384. For instance, accelerometers or other inertial sensors or like sensors for producing orientation and/or pose data for the camera head to generate the orientation/pose data. Leading from step 384, the non-video data, including camera head orientation/pose, may be encoded in step 386. In some embodiments, such as step 356 of method 350 (FIG. 3B), encoding may include modulating the luminance of some number of pixels to create groupings of light or dark pixels. These groupings may be generated in a pattern to represent the non-video data. Likewise, encoding of non-video data embedded into the vertical blanking interval (VBI) may be achieved through modulation of other video signal aspects. Such patterns may further be known and decipherable at the CCU. In other embodiments, encoding of the non-video data may include modulating of colors or other pixel or pixel grouping characteristics.

In a step 388 from steps 382 and 386, the encoded non-video data may be embedded into the video signal. In some embodiments, such as with step 358 of method 350 (FIG. 3B), non-video data may be embedded into the active video frame. For instance, in some embodiments, the non-video data may be embedded in alternating lines or portions of alternating lines of an active interlaced video in a known manner (e.g., adaptive based on an algorithm or driven by conditions) and/or in the VBI. In a step 390, the embedded video may be communicated to a CCU and/or other display and user input element such as a smart phone, laptop, or like computing device. In a step 392, the embedded non-video data including orientation/pose data may be decoupled from the video signal. In a step 394, a corrected video signal may be generated from adjacent video lines or pixels. In some embodiments, such as step 364 of method 350 (FIG. 3B), adjacent lines or pixels may be copied and replaced over embedded non-video data lines or pixels. In other embodiments, the corrected video may be generated by averaging pixel luminance or color or other pixel aspect from contiguous pixels on adjacent video lines to each pixel location of the corrected lines.

In a step 396, which may be concurrent to step 394, the non-video data including the camera head orientation/pose data may be decoded. In some embodiments, decoding instructions may be communicated in the VBI data. In a step 397 the orientation/pose of the video from step 394 may be corrected using the camera head orientation/pose data decoded in step 396. In a step 398 from step 397, the corrected video with a corrected orientation/pose may be displayed and or stored on a CCU or other display and user input element. In a step 399 leading from step 396, the decoded non-video data may be stored and/or used and/or transmitted to another system device or system. For instance, in one embodiment, acoustic/audio data may reproduce in-pipe sounds at the CCU or other display and user input element allowing a user to listen to the sounds present at the camera position in the pipe in real time or near real time. Sensed sounds at non-human audible frequencies may be mixed up or down to human-audible frequencies for listening by a user.

Figure 4A:
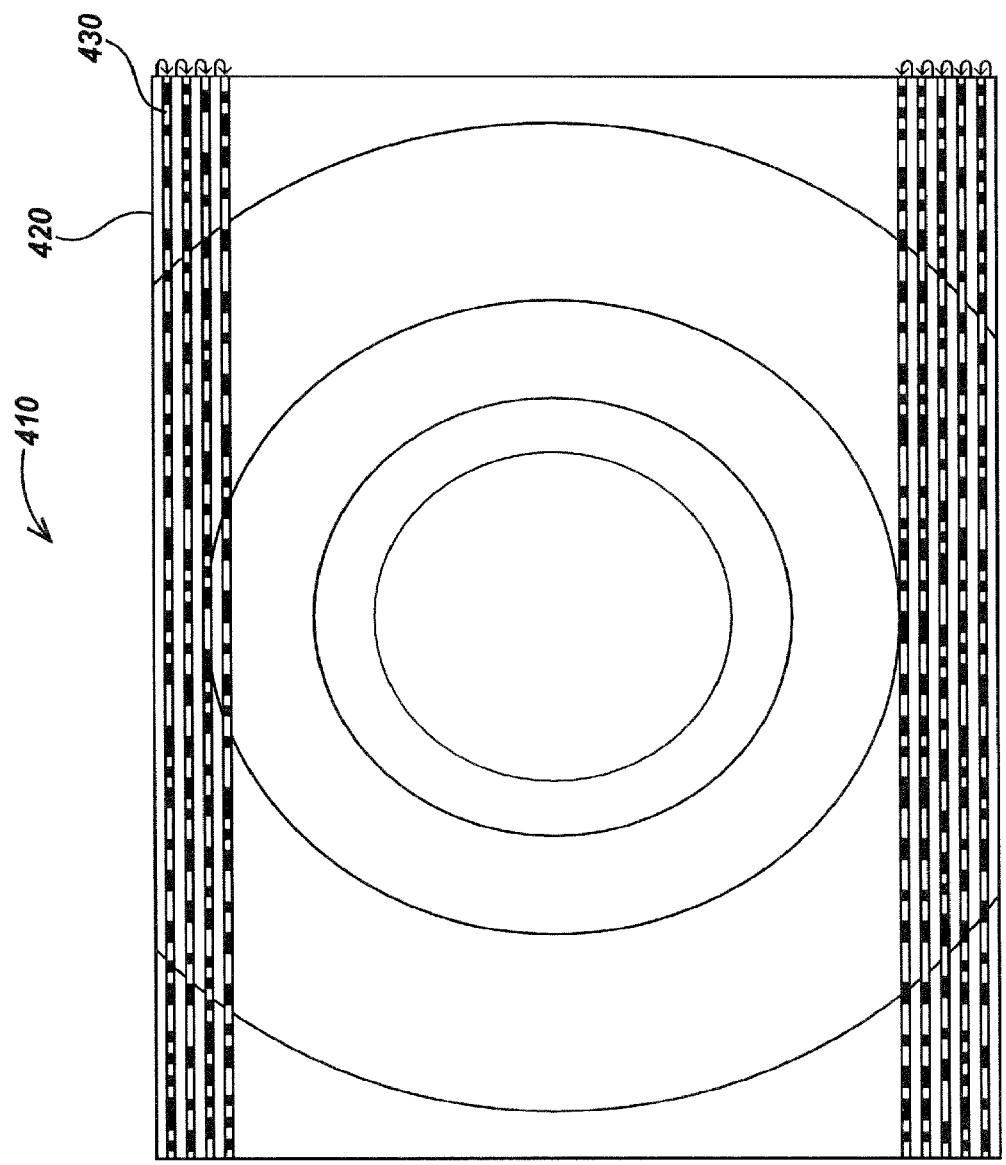
FIG. 4A is an illustration demonstrated interspersed data embedding in a video.
Figure 4B:
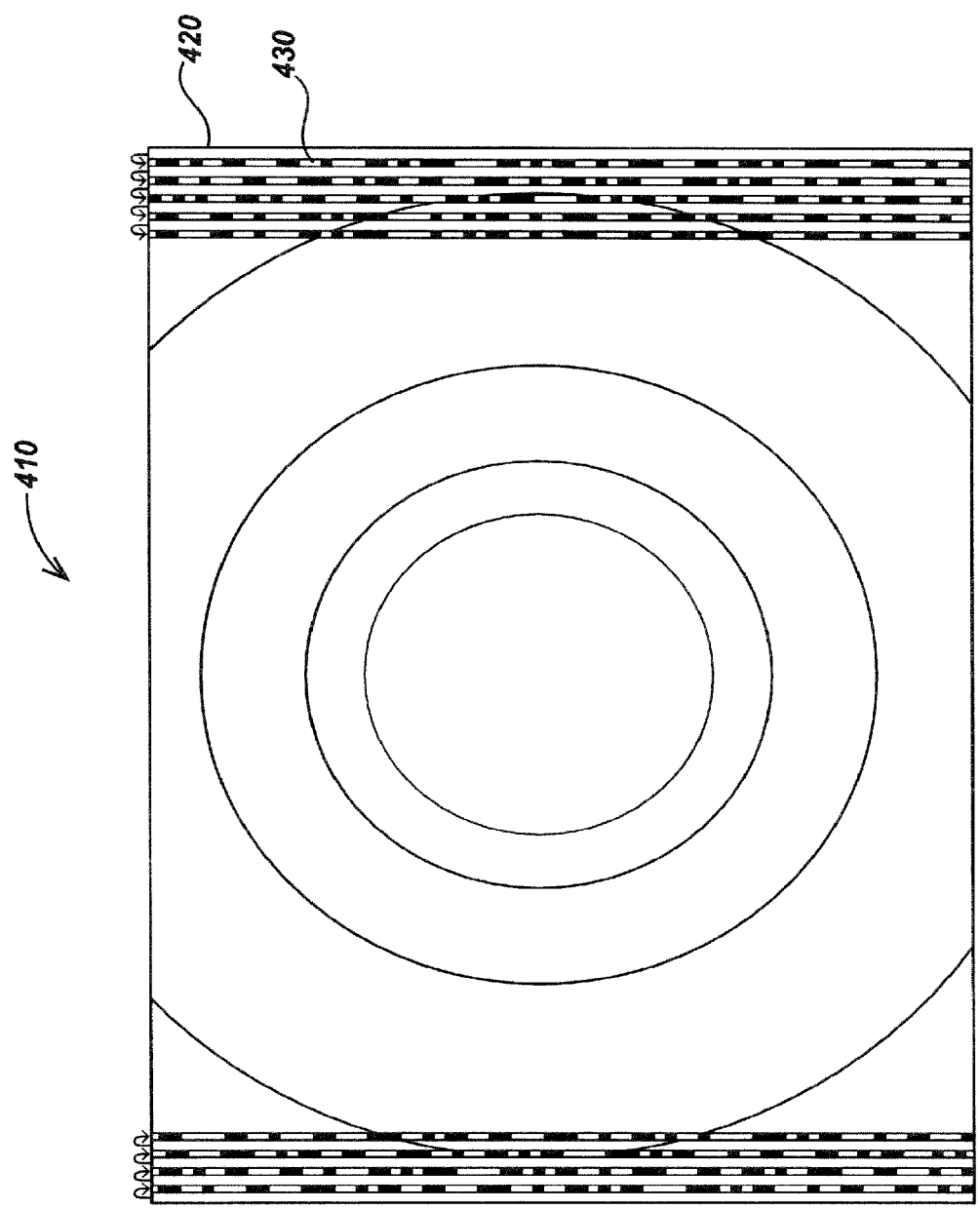
FIG. 4B is another illustration demonstrated interspersed data embedding in a video.

Turning to FIGS. 4A and 4B, exemplary interspersed data embedding is illustrated. The video 410 may be interstitial analog video comprising odd and even lines stitched together. Some such lines may be video lines 420 configured to communicate video signal whereas some alternating lines may non-video lines 430 configured to communicate non-video data that may be encoded, for instance, as described in method 300 of FIG. 3A or method 350 of FIG. 3B. The non-video lines 430 may appear in some number of lines around the periphery of the active video frame. In other embodiments (not illustrated), non-video line may be present in the middle of the active video frame or throughout the entire active video frame. In correcting the video frame for display, video lines 420 adjacent to the non-video lines 430 may be copied and replace the non-video lines 430. In other embodiments, the corrected video may be generated by averaging pixel luminance or color or other pixel aspect from contiguous pixels on adjacent video lines 420 to each pixel location on the non-video line 430. In some embodiments, such as in FIG. 4A, the non-video lines 430 may be horizontally oriented. In other embodiments, such as in FIG. 4B, the non-video lines 430 may be vertically oriented. In yet further embodiments, the non-video lines 430 may only be partial lines.

Turning back to FIG. 2, the camera head 210 may further include a data link receiver circuit 219 to receive program instructions such as data link signal 234 initiated from the CCU 180 or, in some embodiments, other directly or indirectly wired or wirelessly connected computing device such as the computing devices 295 to configure or reconfigure camera head 210 software and/or firmware. The data link signal 234 may be out of band to the embedded video signal generated at the camera head 210. In system 200, the data link signal 234 may be on-off-keyed data modulated onto a 13.5 MHz signal or other common data technique involving a fixed or variable carrier out of band in the frequency spectrum for the video signal. In some system embodiments, boot loading firmware of camera head 210 may be achieved via data link signals 234 communicated from the CCU 280. Further information regarding a method for boot loading a camera head is described in method 1400 of FIG. 14. In some such embodiments, a CCU may be configured to authenticate a camera head, thus preventing a stolen camera head to operate on other CCUs. This authentication may be done by methods known or developed in the art. For example, further details of one method for authenticating a camera head which may function to deter theft thereof are described in method 1500 of FIG. 15.

Figure 5:
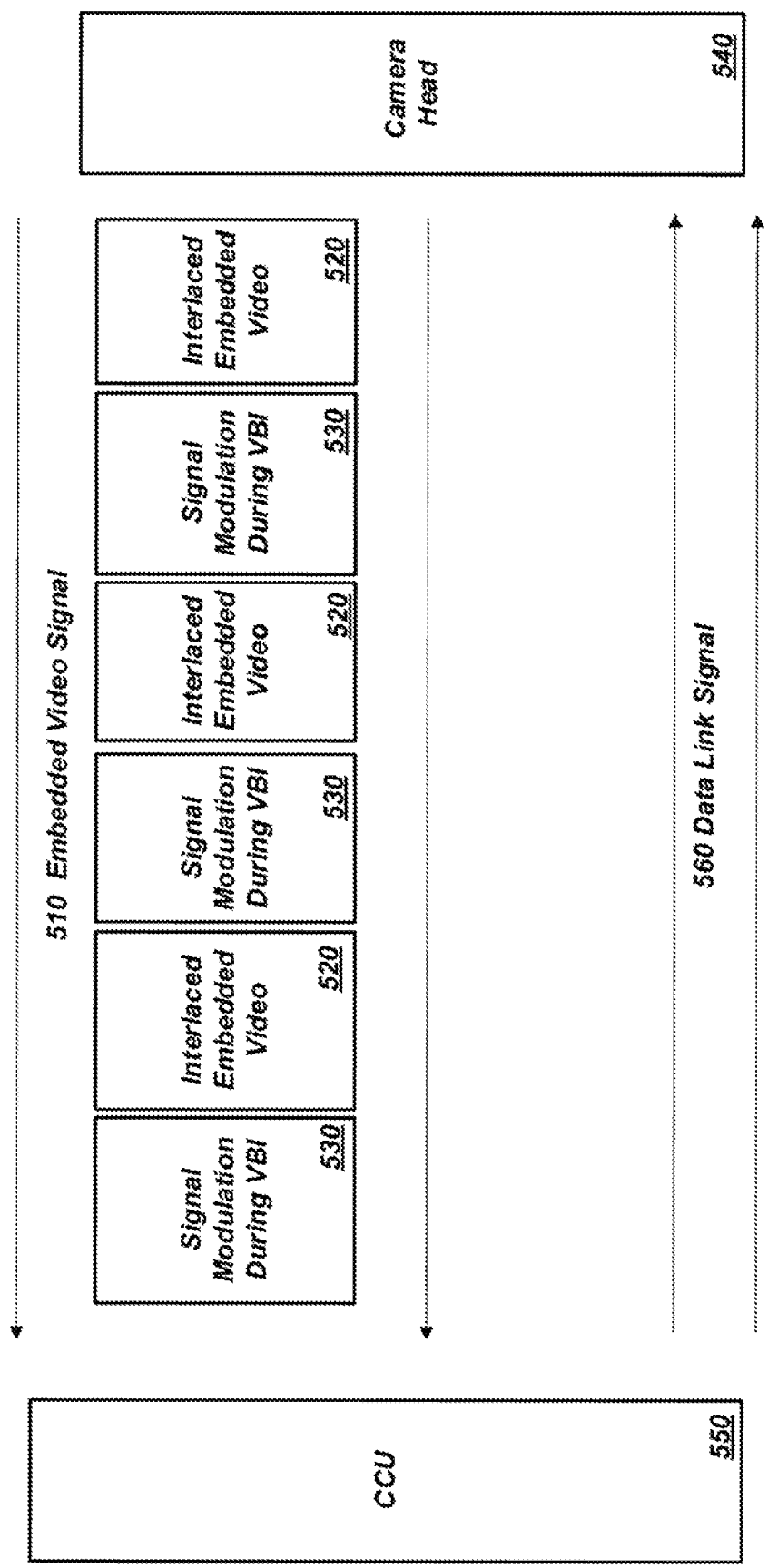
FIG. 5 is an illustration demonstrating communicating an embedded video signal using interspersed data embedding and VBI as well as communicating a data link signal.

As illustrated in FIG. 5, the embedded video signal 510 may include non-video data embedded in the active interlaced embedded video 520 as well as communicated via signal modulation during vertical blanking intervals 530. The embedded video signal 510 may be communicated from a camera head 540 and be communicated to a CCU 550. A data link signal 560 which may be out of band to the embedded video signal 510 that may be communicate from CCU 550 to camera head 540.

Turning back to FIG. 2, camera head 210 may optionally include a secondary processing element 220 which may receive instruction to control LED modulation 221. In some embodiments, LED modulation 221 may instead occur with processing element 216. In system embodiment 200, the LED modulation 221 may be used to communicate control signals to other non-connected system devices (not illustrated) disposed on or near camera head 210. For instance, an external steering mechanism (not illustrated) may be disposed near camera head 210 that may not otherwise be electrically coupled to the camera head 210 or other connected system devices. LED modulation 221 may signal to the steering device (not illustrated) to steer the camera head 210 in a preferred direction as indicated at the CCU 280 by a user. The camera head 210 may further include data storage 222 which may include non-transitory computer readable medium for storage of camera head or other system or inspection related data.

Figure 6A:
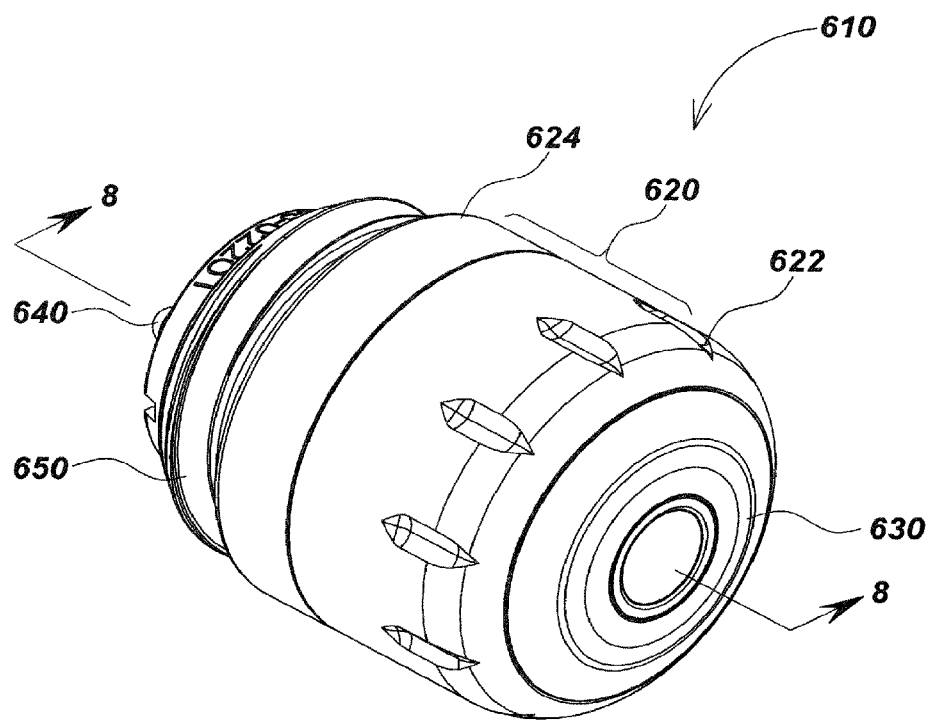
FIG. 6A is a front isometric view of a camera head.
Figure 6B:
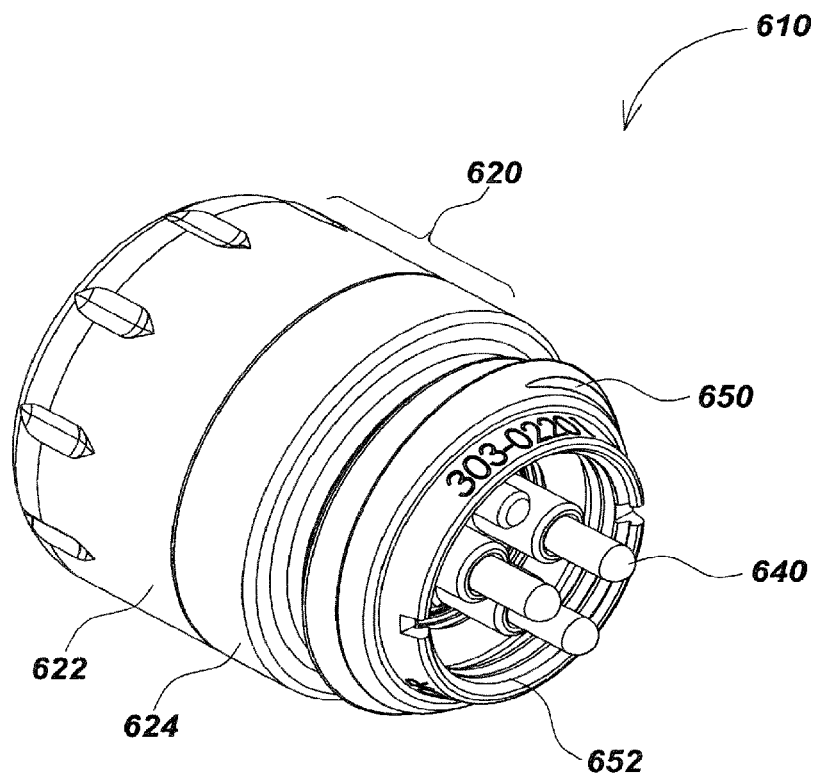
FIG. 6B is a rear isometric view of a camera head.

Turning to FIGS. 6A and 6B, a camera head 610 is illustrated which may be or share aspects with the camera head 110 of the inspection system 100 of FIG. 1 or camera head 210 of the inspection system 200 of FIG. 2. Camera head 610 may have an external housing 620 comprising of a front housing 622 and a rear housing 624.

Figure 7:
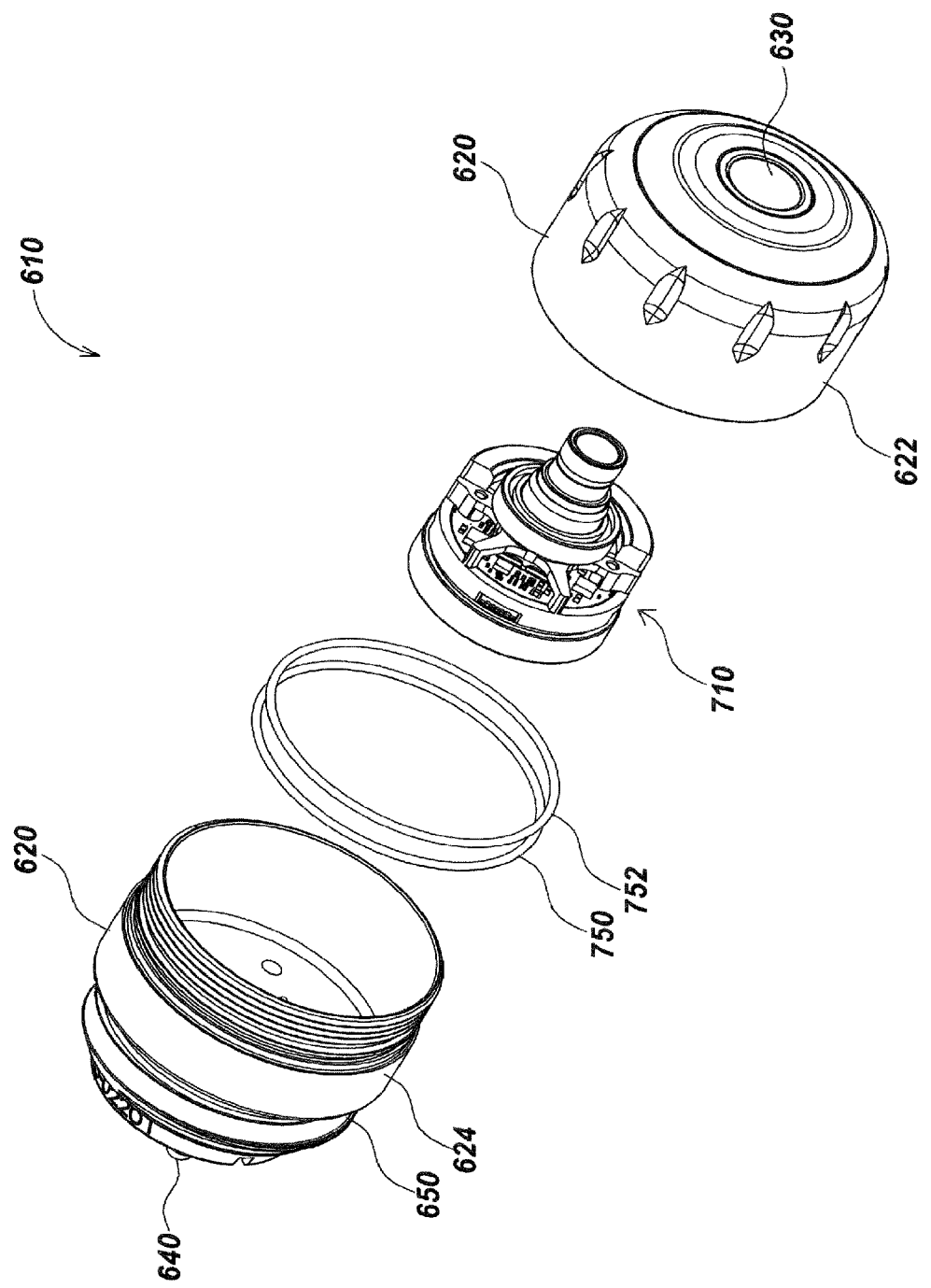
FIG. 7 is a partially exploded view of the camera head from FIG. 6A.

As illustrated in FIG. 6A, the front housing may have a window 630 allowing the light to pass to one or more image sensors in a camera module disposed inside camera head 610, such as image sensor 810 (FIG. 8) of camera module 710 (FIG. 7). Likewise, light may pass from an illumination element such as LEDs 830 of FIG. 8 inside camera head 610 to illuminate the inside of the pipe or other work area.

As illustrated in FIG. 6B, a connector 640 may extend out from the rear housing 624 allowing signal to communicate with electronic components inside camera head 610. The connector 640 may be a three pin connector as used in some current analog pipe inspection camera heads and systems allowing the camera head 610 to be used with certain currently available push-cables and related inspection system devices provided by SeeScan, Inc., assignee of this application. The rear housing 624 may further be formed with threads 650 and threads 652 allowing a push-cable to secure thereto.

Turning to FIG. 7, the camera head 610 may include a camera module 710 disposed inside the front housing 622 and rear housing 624. One or more O-rings, such as the O-rings 750 and 752, may seat between front housing 622 and rear housing 624 providing a water tight seal to camera head 610.

Figure 8:
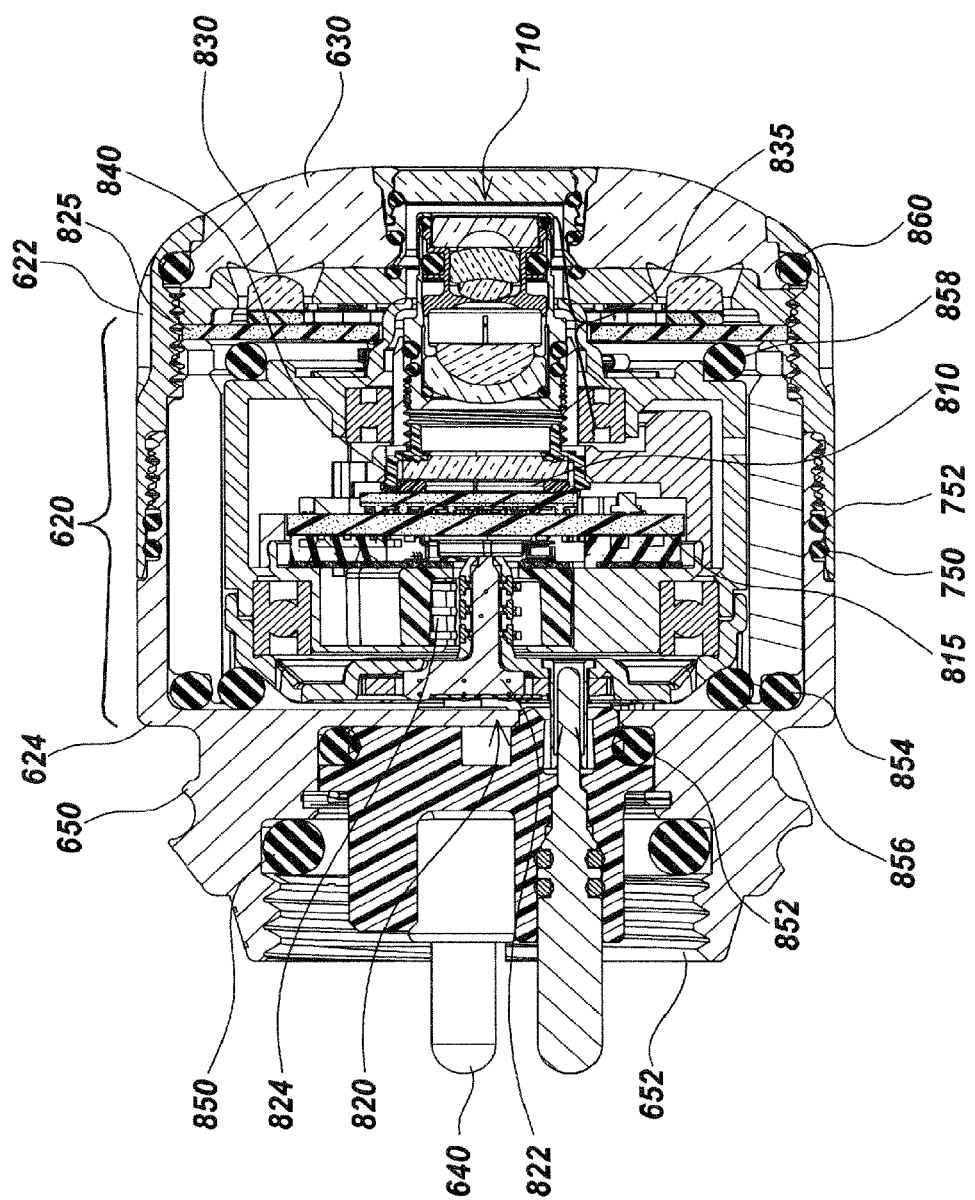
FIG. 8 is a section view of the camera head from FIG. 6A along line 8-8.

As illustrated in FIG. 8, additional O-rings 850 and 852 may be disposed near between connector 640 and rear housing 624 as well as O-rings 854-860 positioned at other locations of potential water ingress to further ensure a water tight seal to camera head 610. The camera module 710 may include image sensor 810 disposed on a PCB 815 which may be an HDR imager. The PCB 815 may be coupled to a mechanical self-leveling mechanism 820 allowing the camera module 710 and attached image sensor 810 to self-level and provide upright video while communicating signal and provide power to the PCB 815 and a components thereon.

The mechanical self-leveling mechanism 820 may include a male self-leveling subassembly 822 extending into the camera module 710 and a female self-leveling subassembly 824 seated inside the camera module 710 to communicate signal and receive power from the male self-leveling subassembly 822 further coupled to connector 640. The mechanical self-leveling mechanism 820 may be or share aspects with the U.S. Pat. No. 8,587,648, issued Nov. 19, 2013, entitled Self-Leveling Camera Head or U.S. Pat. No. 9,927,368, issued Mar. 27, 2018, entitled Self-Leveling Inspection Systems and Methods of the incorporated patent applications. The components disposed on PCB 815 may include those illustrated and described in conjunction with FIG. 2 or otherwise described herein in conjunction with a camera head. The camera module 710 may further include an additional PCB 825 with one or more LEDs 830 or like illumination element to illuminate the interior of a pipe or other work area. A connector (not illustrated) may further communicate signal and provide power to PCB 825 and LEDs 830. The camera module 710 may include a lens module 835 having one or more optical lenses allowing light to pass to image sensor 810 on PCB 825. A light control element 840 may seat on image sensor 810 between image sensor 810 and lens module 835 controlling the amount of light allowed to pass to image sensor 810.

Figure 9:
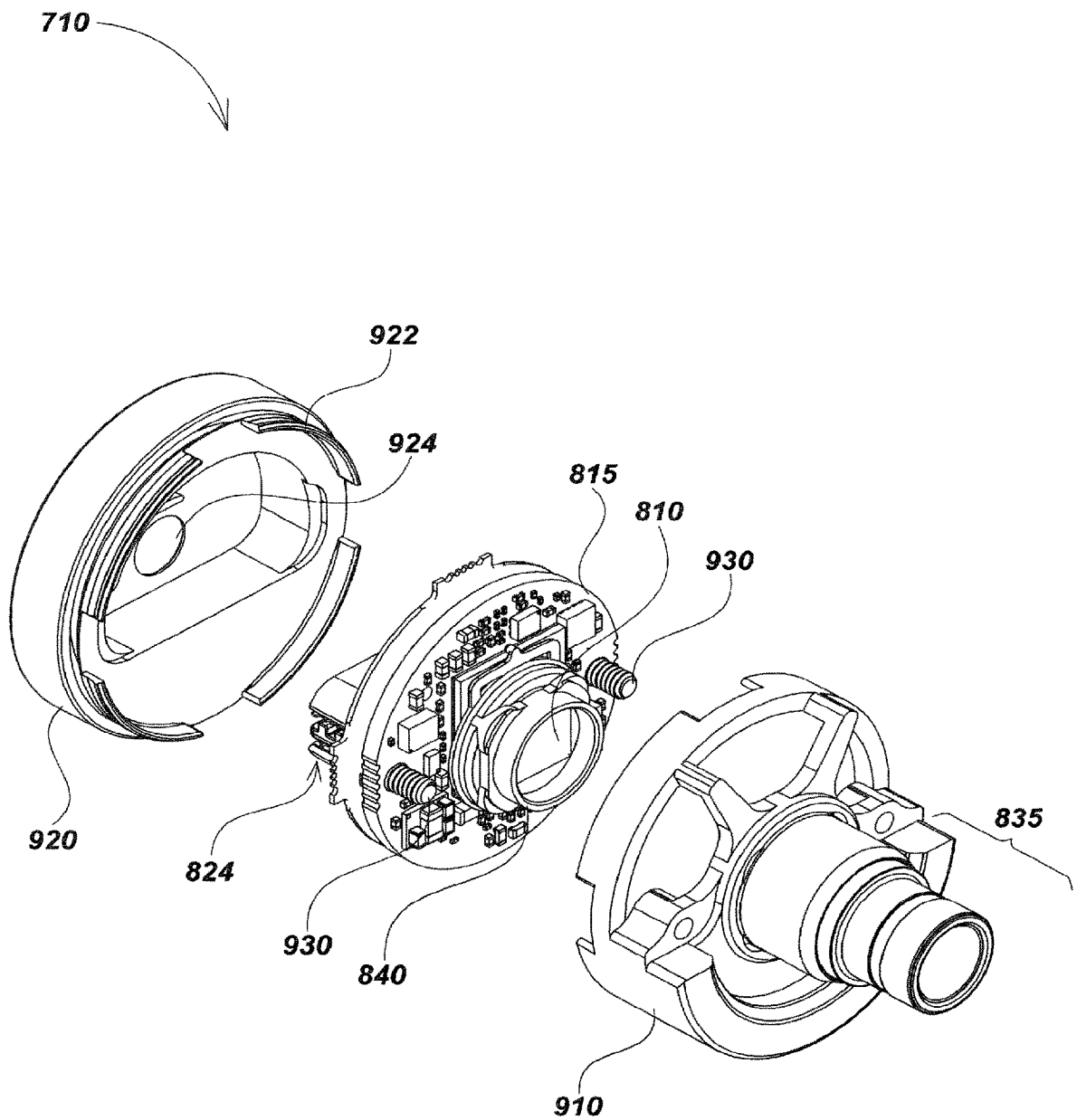
FIG. 9 is a partially exploded view of a camera module.

Turning to FIG. 9, the camera module 710 may include a front camera module 910 and rear camera module 920 securing PCB 815 and image sensor 810 and the female self-leveling subassembly 824. The female self-leveling subassembly 824 and PCB 815 may secure to the front camera module 910 with image sensor 810 facing forward through the lens module 835 on front camera module 910 via bolt 930. The rear camera module 920 may be formed with threads 922 such that the rear camera module 920 may secure to the front camera module 910. The rear camera module 920 may further be formed with an opening 924 allowing the male self-leveling subassembly 822 (FIG. 8) to extend into camera module 710.

Turning to FIG. 10, a method 1000 to determine a pipe's material from acoustic/audio signals may include a first step 1010 wherein a pipe inspection may be performed including collecting in-pipe audio data. The step 1010 may utilize the pipe inspection systems and camera head embodiments described herein. In a second step 1020, the audio data may be compared against a database relating in-pipe audio signatures to pipe materials. This may be pre-generated by measuring and storing acoustic data on various pipe materials, sizes, shapes, and the like. In a step 1030, a best fit may be determined from the pipe inspection in-pipe acoustic data to that of the database. In a step 1040, the pipe material may be determined by best fit of step 1030 based on a best match between the sensed acoustic data and the stored database information.

Figure 11:
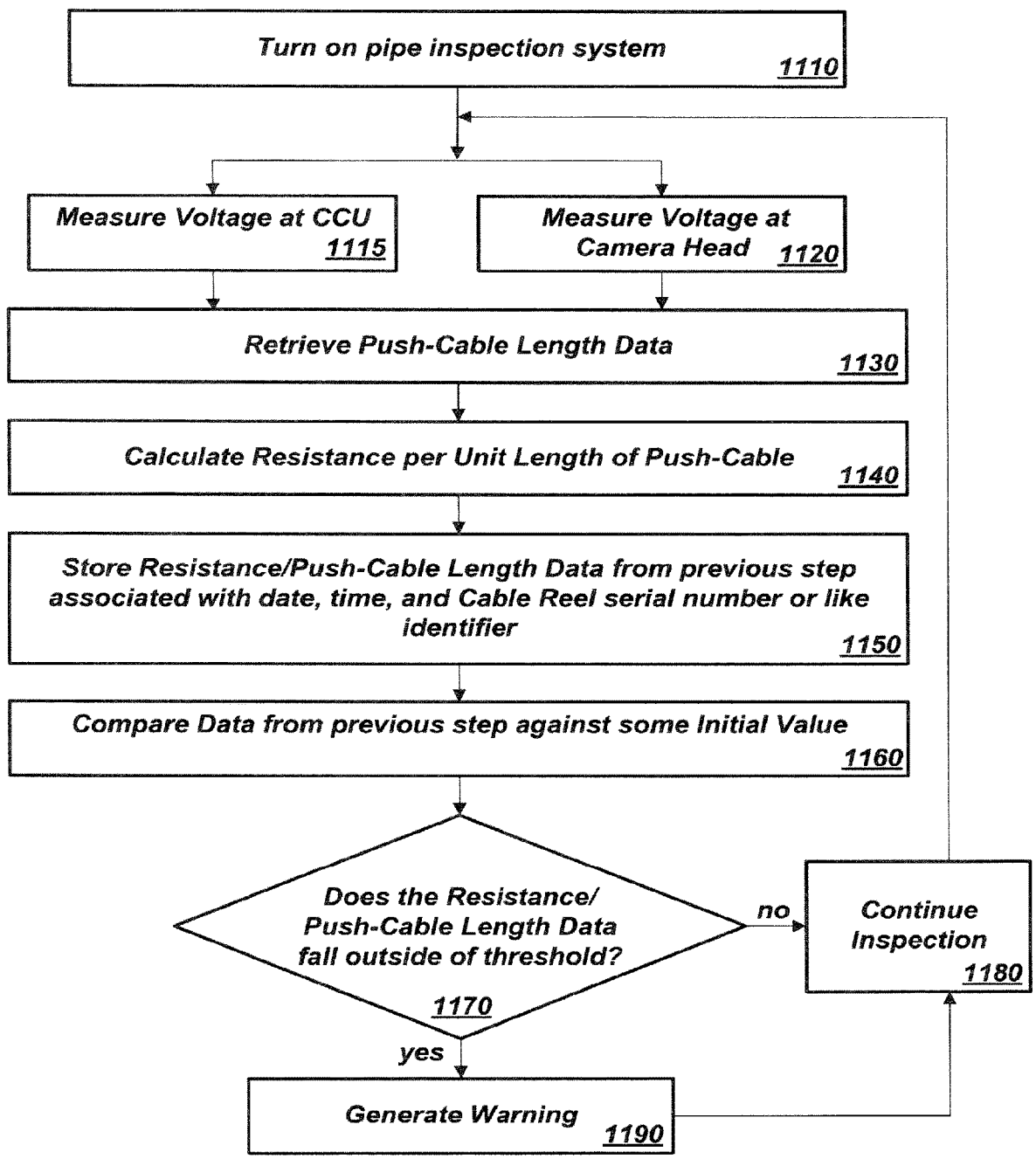
FIG. 11 is a method for testing a push-cable health.

Turning to FIG. 11, a method 1100 for determining the health of a push-cable is described. In concurrent first steps 1115 and 1120 voltage may be measured at both the CCU and at the camera head. In a step 1130, data describing the length of the push-cable may be retrieved. Each cable reel may, for instance, have a serial number or like identifier that may reference a database having the push-cable length. In some embodiments, the cable reel may communicate data which may include the length of the push-cable contained inside. In a step 1140 the resistance per unit length of push-cable is calculated. In a step 1150, the resistance per unit length of push-cable is associated and stored along with a time, date, and cable reel serial number or like identifier. In a step 1160, the resistance per unit length of push-cable data and associated time, date, and cable reel serial number or like identifier may be compared against some initial value. The initial value may, in some embodiments, come from a database of past values for the particular cable reel or from like cable reels. In a step 1170, a question may be asked as to whether the resistance per unit length of push-cable data falls outside of a threshold.

The threshold, in some embodiments, may be any deviation beyond a range from a pre-defined initial value. In other embodiments, the threshold may be a range of value predetermined to be in a range of what is healthy for a push-cable having similar properties. If the resistance per unit length of push-cable data falls does not fall outside of the threshold in step 1170, method 1100 may continue to step 1180 wherein the pipe inspection may continue. If the resistance per unit length of push-cable data falls does fall outside of the threshold in step 1170, method 1100 may continue to step 1190 wherein a warning may be generated. In some method embodiments, the warning may be displayed to or otherwise alert a user via the CCU or other display and user input element. In yet further embodiments, such as those having a direct or indirect connection to the internet, may issue a warning may instead or additionally to be communicated back to a service center. Such warning data may include information regarding the push-cable or cable reel in which it sits such as serial number or other identifier, time and date of the identified problem, as well as data identifying the problem. From step 1190, method 1100 may continue to step 1180 wherein the pipe inspection may continue. From step 1180, the method 1100 may optionally repeat at concurrent steps 1115 and 1120.

Figure 12:
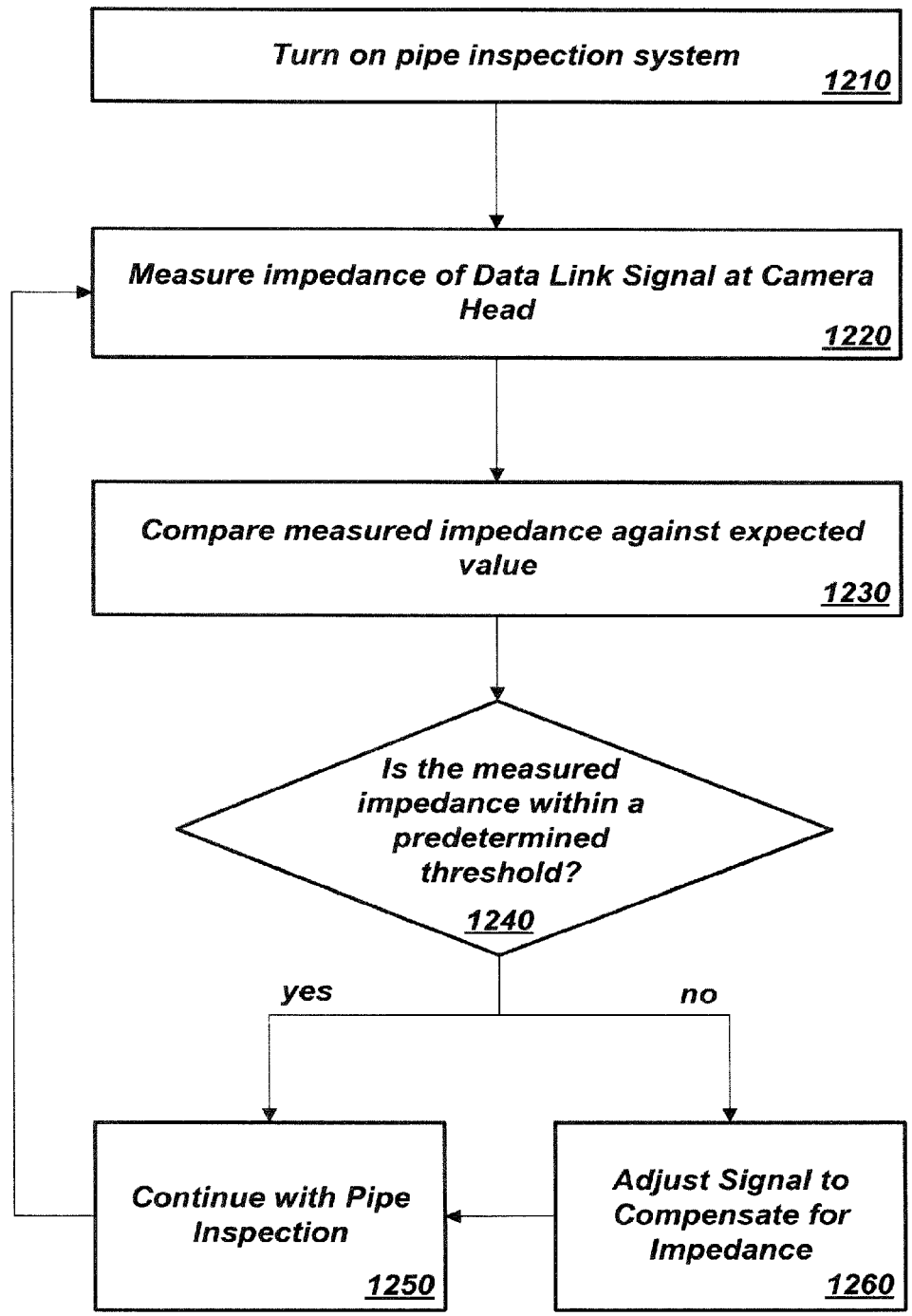
FIG. 12 is a method for correcting impedance on a video signal between a camera head and CCU.

Turning to FIG. 12, a method 1200 for compensating for frequency-dependent losses that may impact video signals sent to a CCU from a camera head in keeping with aspects of the present disclosure is described. In a step 1210, the pipe inspection system may be turned on. In a step 1220, the impedance of a data link signal may be measured at the camera head. In a step 1230, the measured impedance from the prior step may be compared to an expected impedance value. For instance, the expected impedance may be a value or range of values of the impedance of the data link signal at the camera head given a length and type of push-cable. This value or range of values may be accessed from a database stored in memory (such as data storage 222 of FIG. 2) in the camera head. In a step 1240, a decision stage may be implemented to determine whether the measured impedance is within a predetermined threshold. The threshold of step 1240 may account for some variance from the expected impedance value. From step 1240, if the measured impedance is within the expected impedance value threshold, method 1200 may continue to step 1250 wherein the pipe inspection may continue. From step 1240, if the measured impedance is not within the expected impedance value threshold, method 1200 may continue to step 1260 wherein the transmitted video signal may be adjusted to compensate for the evaluated impedance variance. From step 1260, the method 1200 may continue to step 1250 again where the pipe inspection may continue. From step 1250, the method 1200 may optionally repeat back at step 1220.

In some embodiments, a signal from a camera head, such as the video or non-data signals, may be subject to attenuation as it is transmitted from the distal end of the video push-cable to the proximal end of the video push-cable. This attenuation may cause the received signal to differ from the transmitted signal. The CCU may be enabled to send, or cause to be sent, to the camera head, a message requesting that the camera transmit a fixed reference pattern. The camera may then reply with an acknowledgement of the request, and transmit a fixed reference pattern to the CCU. For example, the fixed reference pattern or signal may be the "color bars" of analog video or some other signal such as a black and white "checkerboard". A difference between what the sent reference pattern from the camera head and received reference pattern at the CCU may be used to generate a correction pattern or signal. The correction pattern or signal may then be applied to subsequently received video or still images, to correct for the attenuation or other undesirable influence of the push-cable. Such a system may operate continuously or periodically as the video pipe inspection camera is advanced into the pipe or other void thereby continuously or periodically correcting for any changes in the signal properties communicated via the push-cable. In some embodiments, the system may save, separately from the video or still images, a time series of correction data that may optionally be applied to the received video or still images, such that the alteration or correction of the video or still images may be reversed by the operator of the system if desired.

Figure 13:
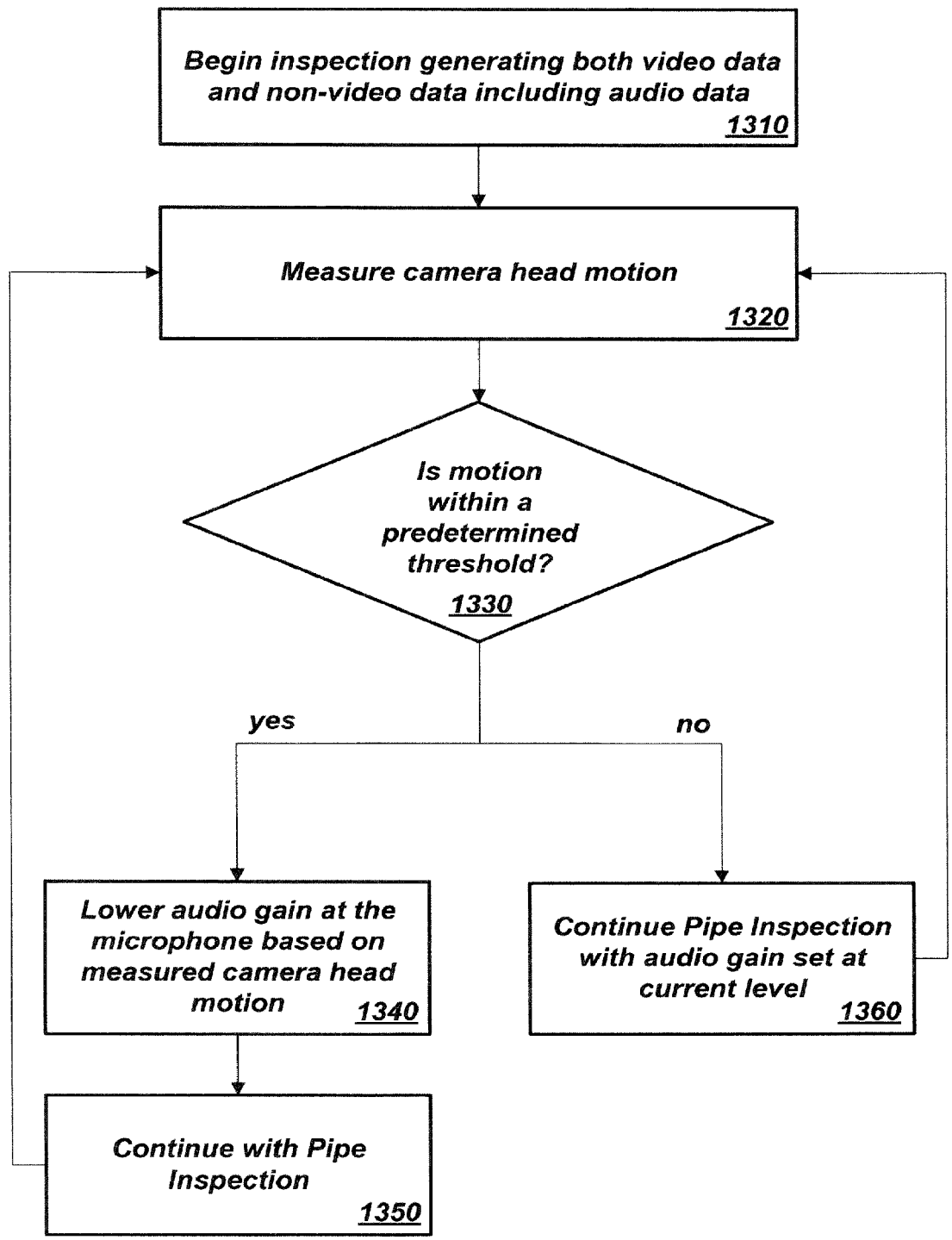
FIG. 13 is a method for adjusting the camera head microphone based on camera head motion.

Turning to FIG. 13, a method 1300 for microphone or other acoustic sensor control based detected motion of a camera head, in keeping with aspects of the present disclosure, is described. In step 1310, the pipe inspection may begin wherein video and non-video data including both in-pipe acoustic/audio data and camera head motion data are generated. The in-pipe acoustic data may be generated by a digital microphone or other acoustic sensor, such as a 24 bit MEMs microphone or a similar bit range acoustic sensor. In a step 1320, camera head motion may be measured. The camera head motion data may be generated by one or more motion which may be one or more multi-axis motion sensors such as a 9-axis motion sensor. The motion data may be handled as quaternions in encoding and embedding such non-video motion data in the video signal.

In a step 1330, a decision stage as to whether the camera head motion is beyond a predetermined threshold may be implemented. This may be determined at the camera head or, in some embodiments, motion data may be communicated to the CCU or like connected computing device for determining camera head motion. From step 1330, if the camera motion is above a predetermined threshold, in a step 1340 the gain for the microphone may be lowered such that the audio signal may be back into the threshold. In a step 1350 following step 1340, the pipe inspection may continue. The method 1300 may either end or again repeat back at the step 1320 wherein the question again may be asked as to whether the camera head motion is beyond a predetermined threshold. If the motion data is not beyond the predetermined threshold, the method 1300 may proceed to step 1360 wherein the pipe inspection may continue. From step 1360, the method 1300 may either end or again repeat back at the step 1320 wherein a decision stage may be implemented as to whether the camera head motion is beyond a predetermined threshold.

Figure 14:
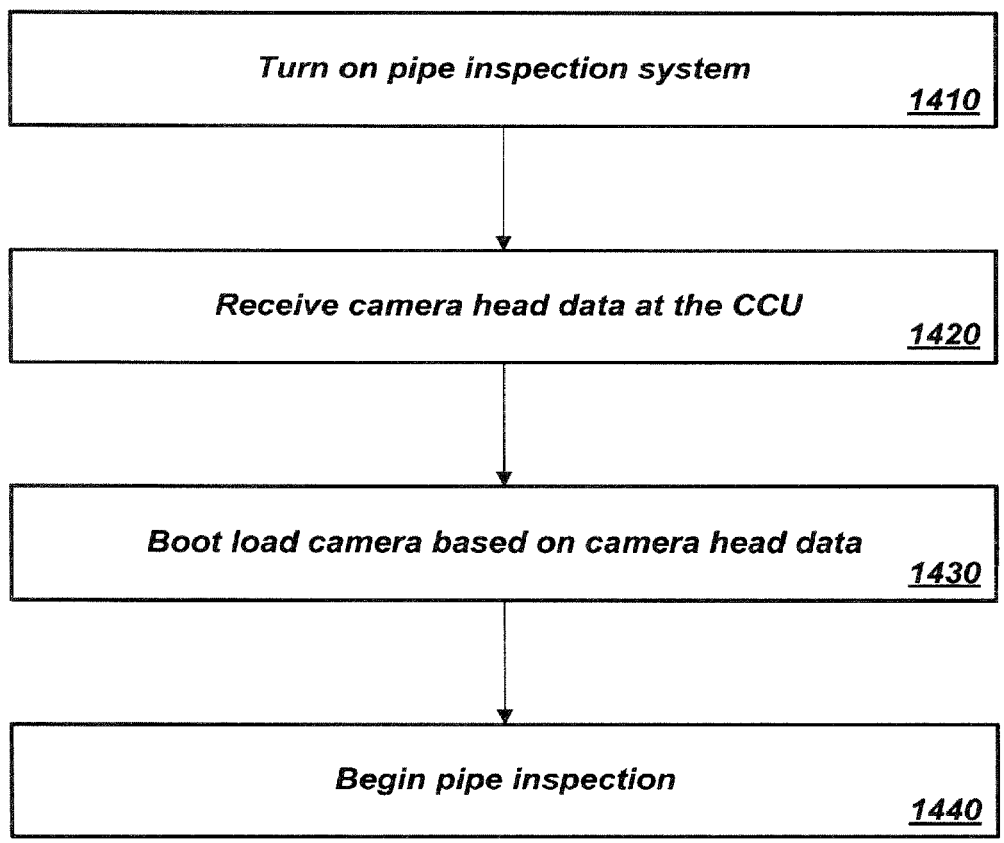
FIG. 14 is a method for boot loading a camera head from a CCU.

Turning to FIG. 14, a method 1400 for boot loading a camera head in keeping with aspects of the present disclosure is described. In a first step 1410, the pipe inspection system may be turned on. In a step 1420, camera head data may be received at the CCU. For instance, camera head data describing the type or aspects of the camera head or otherwise authentication data for the camera head (as described further in method 1500 of FIG. 15) may be embedded into the VBI data or otherwise in the signal received by the CCU sent from the camera head. In a step 1430, the CCU may boot load the camera head by sending program instruction relating to the camera head firmware and/or software instructions and based on the camera head data from the prior step. In a step 1440, the pipe inspection may begin.

Figure 15:
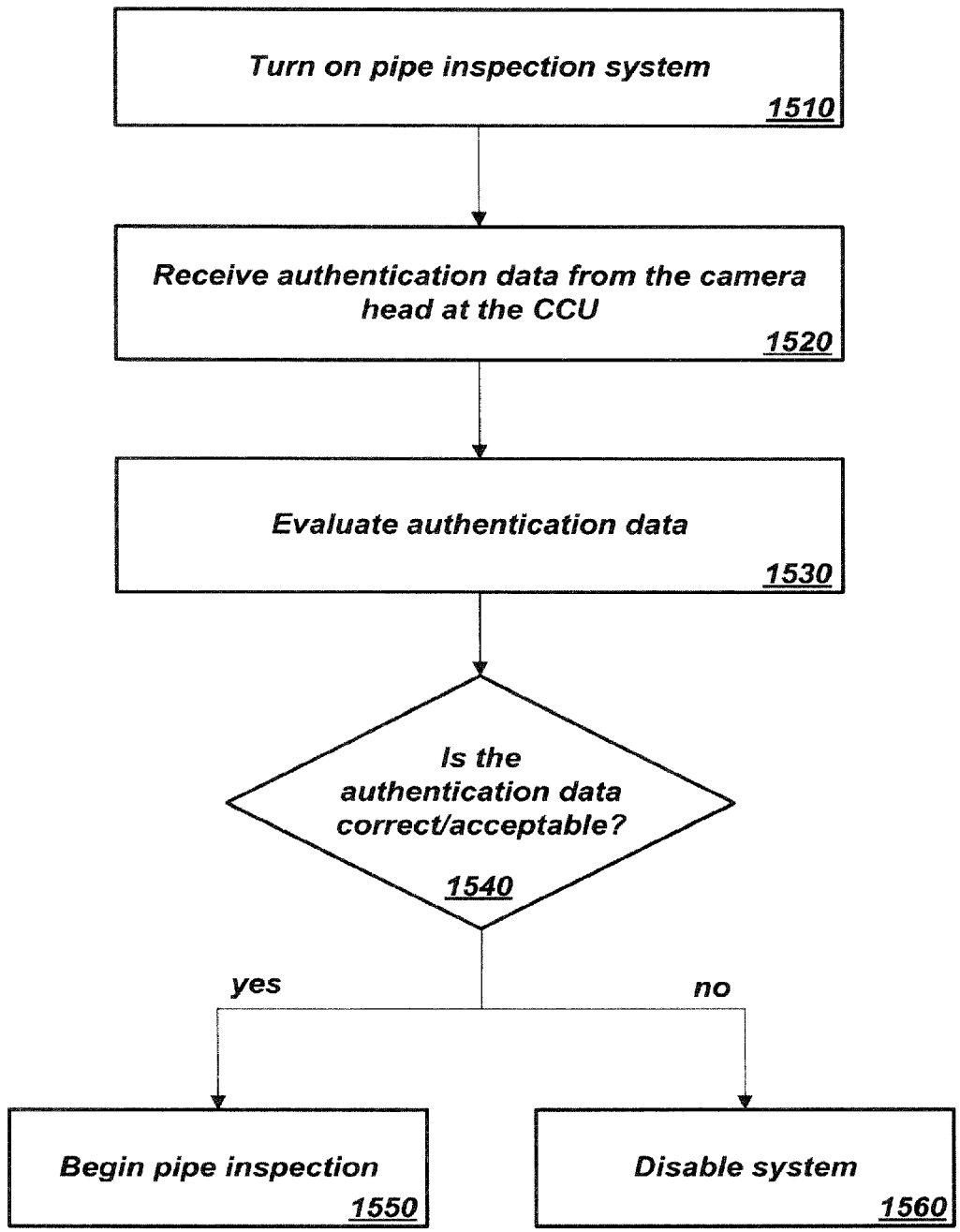
FIG. 15 is a method for authenticating a camera head at a CCU.

Turning to FIG. 15, a method 1500 is described for authenticating a camera head, which may function to deter theft of a camera head in keeping with the present disclosure. In a step 1510, a pipe inspection system, including a camera head coupled to a CCU via a push-cable as described in the system and device embodiments described herein, may be turned on. In a step 1520, the CCU may receive authentication data from the camera head. For instance, the processing element(s) of the camera heads in keeping with the present disclosure may be, include, or function in part as a cryptoprocessor. Such a cryptoprocessor may generate authentication data at the camera head that may be sent to a like cryptoprocessor which may be a processing element in the CCU. In a step 1530, the authentication data may be evaluated. Such an evaluation may, for instance, include checking against a database of correct or acceptable authentication data. Authentication may occur at the CCU, connected device, or a remote server or cloud server (e.g., cloud server 195 of FIG. 1) in systems wherein an internet connection or like data connection may be established. In a step 1540, a question may be asked as to whether the authentication data is correct/acceptable. If the authentication data is correct/acceptable in step 1540, the method 1500 may continue to step 1550 wherein the pipe inspection may begin. If the authentication data is not correct/acceptable in step 1540, the method 1500 may continue to step 1560 wherein the pipe inspection system may be disabled. In some system embodiments, the CCU may further include anti-theft measures such as, but not limited to, physical or software keys, passwords, or other software authentication means.

Figure 16A:
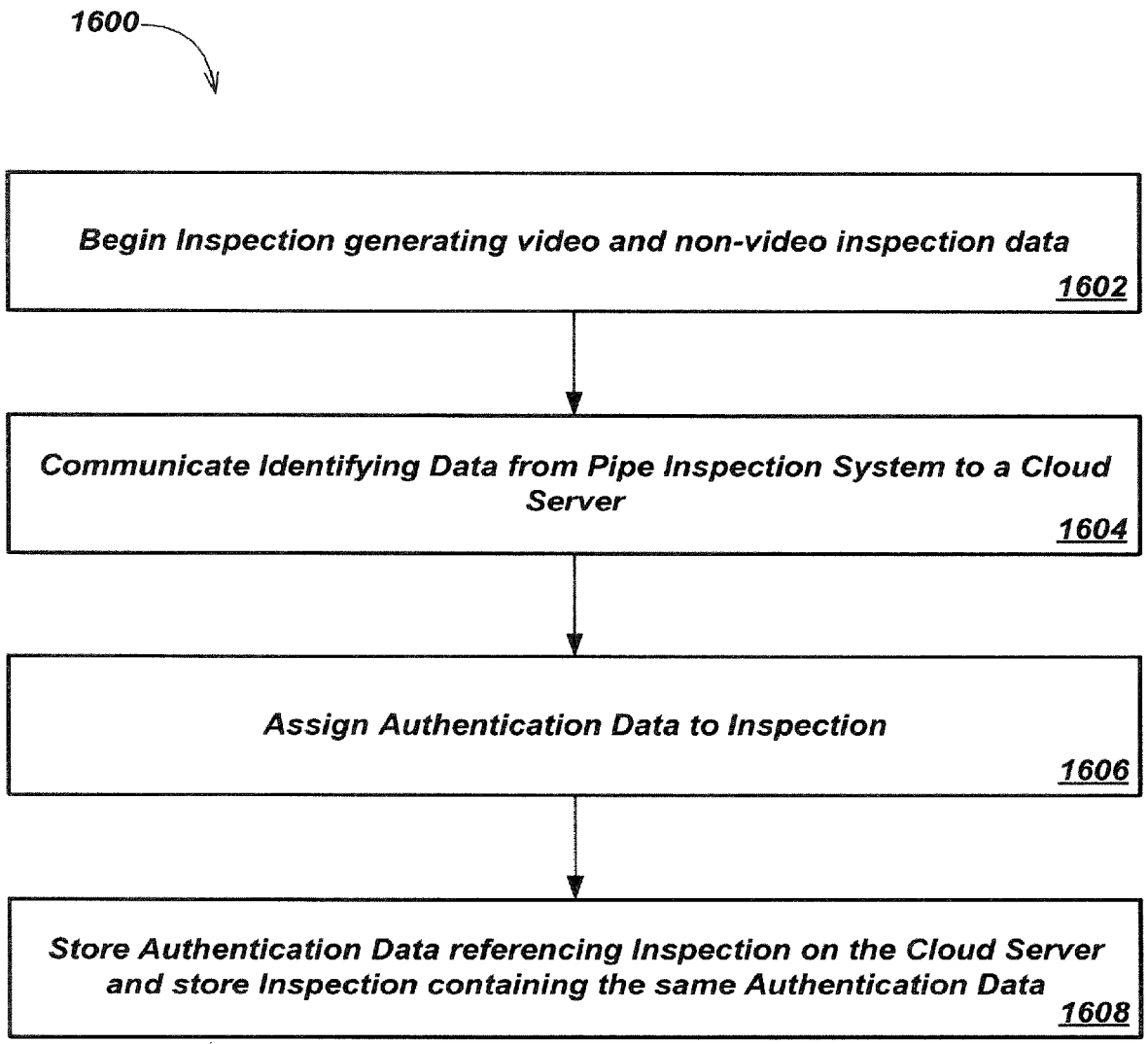
FIG. 16A is a method for adding authentication data to an inspection.

Turning to FIG. 16A, a method 1600 is described for adding authentication data to a pipe inspection which may function to prevent fraudulent inspections. In a first step 1602, an inspection may begin generating video and non-video inspection data. Such a step may include a pipe inspection system having a camera head coupled to a CCU via a push-cable as described in the system and device embodiments herein. The system devices may be turned on to actuate the pipe inspection process and begin recording. In a step 1604, the pipe inspection system may communicate identifying data to a cloud server. Such identifying data may include time and/or location data and/or other data relating to the inspection provided by the cable reel and/or CCU and/or utility locator device and/or other system device. For instance, GNSS receivers in the various system devices may record a precise time and location on the Earth's surface. The time, location, or time and location may be included in the identifying data from the pipe inspection system communicated to the cloud server.

In other embodiments, identifying data maybe or include other data including but not limited to images collected during the inspection. In a step 1606, authentication data may be correlated to the inspection. The authentication data may, for instance, assign an alphanumeric number or similar identifier to the inspection which may be generated via the cloud server and/or by one or more pipe inspection system devices. In some embodiments, the GPS coordinates or other location data and/or time stamp data relevant to the inspection may be used to generate and correlate authentication data with the inspection. In other embodiments, the authentication data may be or include the identifying data from step 1604. In yet other embodiments, the authentication data may serve to encapsulate an uninterrupted, unaltered recorded inspection or portion of the inspection. In a step 1608, the authentication data referencing the inspection may be stored on non-transitory computer readable memories on the cloud server. Likewise, the inspection may be stored on one or more non-transitory computer readable memories which may include that disposed in the cloud server, one or more inspection system devices including the CCU, cable reel, utility locator device, and/or other computing devices (e.g., laptop or desktop computer, other server or database, smartphone, tablet, or like computing device).

Figure 16B:
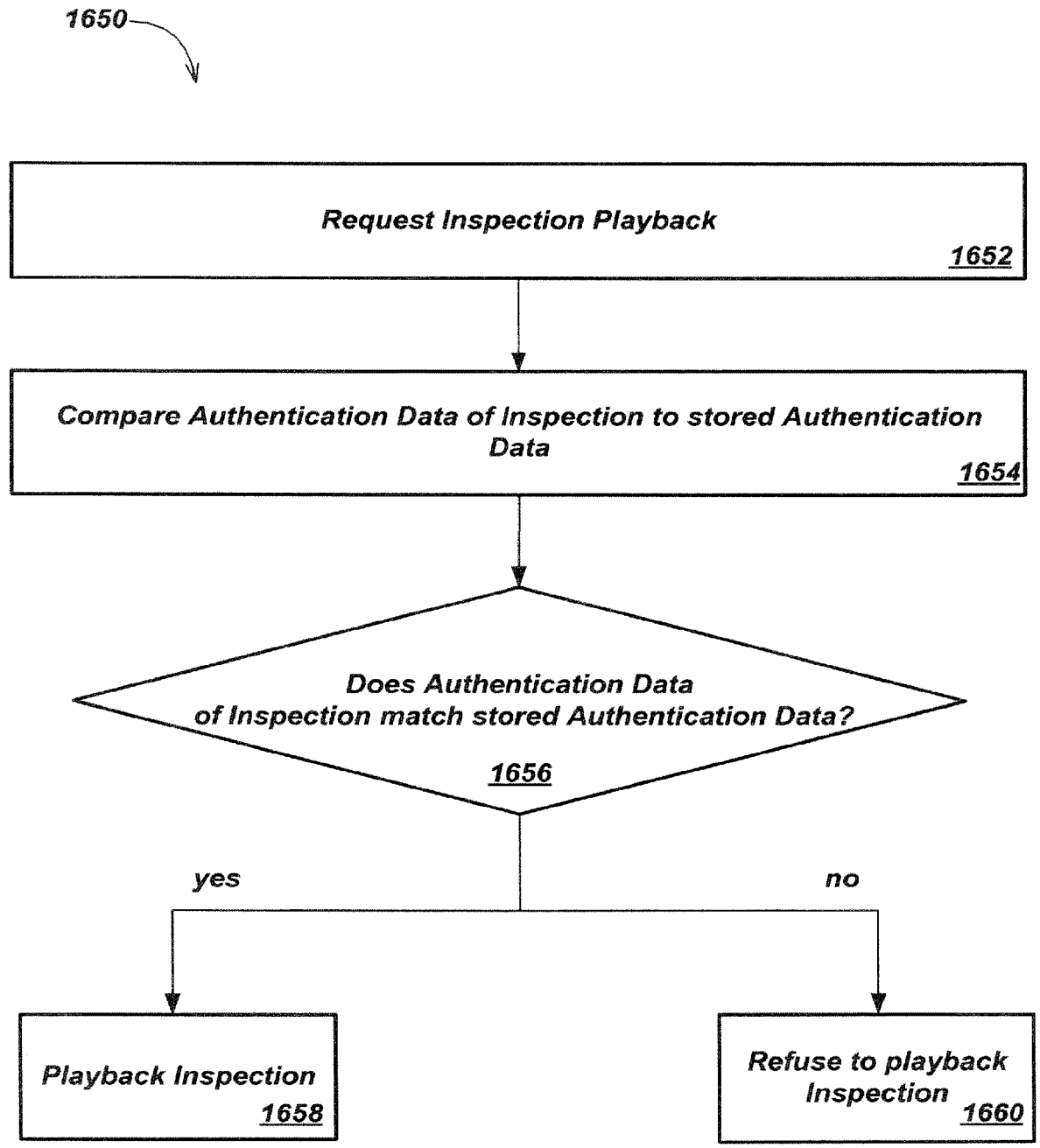
FIG. 16B is a method for authenticating an inspection.

Turning to FIG. 16B, a method 1650 for authenticating an inspection is described. In a step 1652, playback of the inspection may be requested. For instance, a user may press a "start" button or otherwise request or initiate playback of the inspection. In a step 1654, the authentication data of the inspection requested for playback may be compared against the stored authentication data on the cloud server. For instance, the CCU, computer, or other display device may communicate with the cloud server containing stored authentication data. In a step 1656, a determination may be made as to whether the inspection authentication data matches that of the stored authentication data on the cloud server. For instance, GPS coordinates or other location data and/or time stamp data and/or other data or images relating to the requested inspection may be compared to that stored on a cloud server. In a step 1658 leading from the decision in step 1656, if the authentication data does match, playback of the inspection may begin. In a step 1660 leading from the decision in step 1656, if the authentication data does not match playback of the inspection may not begin. In other embodiments, if authentication data does not match, a warning may alternatively be generated regarding mismatched authentication data and/or possible fraudulent inspection data.

Figure 17:
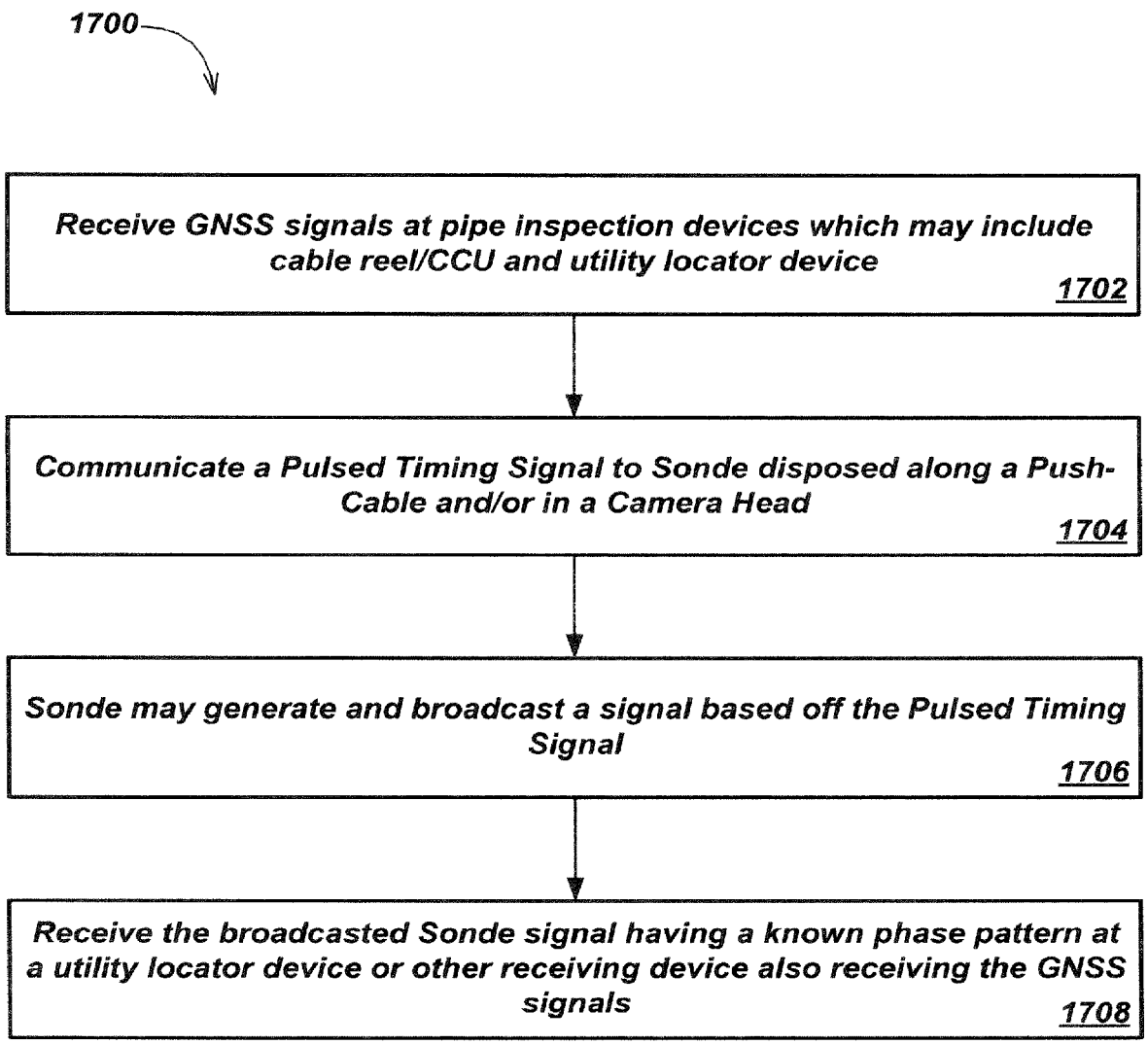
FIG. 17 is a method for phase synchronizing an electromagnetic sonde.

Turning to FIG. 17, a method 1700 for phase synchronizing an electromagnetic sonde with a receiving utility locator device or other signal receiving device in a pipe inspection system is described. In a step 1702, GNSS signals may be received at one or more of the pipe inspection devices including a cable reel (e.g., such as cable reel 170 of FIG. 1) and/or CCU (e.g., such as CCU 180 of FIG. 1) as well as one or more utility locator devices (e.g., such as utility locator device 190 of FIG. 1) and/or other devices for receiving the broadcasted electromagnetic sonde signal. In a step 1704, a pulsed timing signal may be communicated to an electromagnetic sonde disposed along the push-cable and/or in a camera head (e.g., a sonde 235 disposed along the push-cable 230 and/or sonde 225 in camera head 210 of FIG. 2).

The pulsed timing signal may, for instance, be a 1 pulse-per-second (PPS) signal or similar timing signal relating to the precise clocking of received GNSS signals. In a step 1706, the electromagnetic sonde may generate and broadcast a signal based off the pulsed timing signal. For instance, the generated signal may use the timing signal to have a phase pattern which may be known or predicted at the utility locator device or like device above the ground surface. In a step 1708, the broadcasted electromagnetic sonde signal may be received at a utility locator device or other receiving device also receiving that has also received the GNSS signals. The phase pattern of the broadcasted electromagnetic sonde signal may be synchronized to the expected phase pattern of the utility locator device or other receiving device. In some embodiments, the orientation of the sonde in the pipe or other conduit, and thereby the orientation of the attached camera head, may be determined based on measuring the current flow direction of the synchronized phase of the broadcasted electromagnetic sonde signal at the utility locator device.

In one or more exemplary embodiments, certain functions, methods and processes described herein related to control of and/or data communication to or from imaging modules, illumination modules, processing elements, and/or other electronic elements of camera heads, sensors, and associated inspection systems may be implemented in hardware, software, firmware or any combination thereof. If implemented in software, the functions may be stored on or encoded as one or more instructions or code on a non-transitory computer-readable medium. Computer-readable media includes computer storage media. Storage media may be any available media that can be accessed by a computer. By way of example, and not limitation, such computer-readable media can include RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

It is understood that the specific order or hierarchy of steps or stages in the processes and methods disclosed herein are examples of exemplary approaches. Based upon design preferences, it is understood that the specific order or hierarchy of steps or stages in the processes may be rearranged while remaining within the scope of the present disclosure. Any accompanying method claims present elements of the various steps in a sample order, and are not meant to be limited to the specific order or hierarchy presented unless explicitly noted.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles or any combination thereof.

Those of skill would further appreciate that the various illustrative logical blocks, modules, circuits and algorithm steps described in connection with the embodiments disclosed herein may be implemented as electronic hardware, computer software or combinations of both. To clearly illustrate this interchangeability of hardware and software, various illustrative components, blocks, modules, circuits and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the disclosure.

The various illustrative logical blocks, modules, and circuits described in connection with the embodiments disclosed herein and, for example, in processing elements as described herein may be implemented or performed with a general purpose processor, a digital signal processor (DSP), an application specific integrated circuit (ASIC), a field programmable gate array (FPGA) or other programmable logic device, discrete gate or transistor logic, discrete hardware components or any combination thereof designed to perform the functions described herein. A general purpose processor may be a microprocessor, but in the alternative, the processor may be any conventional processor, controller, microcontroller or state machine. A processor may also be implemented as a combination of computing devices, e.g., a combination of a DSP and a microprocessor, a plurality of microprocessors, one or more microprocessors in conjunction with a DSP core or any other such configuration. A processing element may furthering include or be coupled to one or more memory elements for storing instructions, data and/or other information in a non-transitory digital storage format.

The steps or stages of a method, process or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, CD-ROMs or any other form of storage medium known or developed in the art. An exemplary storage medium is coupled to the processor such that the processor can read information from, and write information to the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The scope of the presently claimed invention is not intended to be limited to the aspects shown and described previously herein, but should be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c.

The previous description of the disclosed embodiments and aspects is provided to enable any person skilled in the art to make or use embodiment of the present invention. Various modifications to these embodiments and aspects will be readily apparent to those skilled in the art, and the generic principles defined herein may be applied to other embodiments and aspects without departing from the spirit or scope. Therefore, the presently claimed invention is not intended to be limited specifically to the aspects and embodiments shown herein, but is to be accorded the widest scope consistent with the appended Claims and their equivalents.

We claim:

1. A video camera system for use in internal pipe inspection, comprising:
   a camera head including:
   an outer housing having a hollow interior;
   a camera module assembly including:
      one or more image sensors supported inside the housing for generating video and still image data corresponding to an interior of a pipe, and;
      one or more non-video sensors for generating non-video data;
   a processing circuit, operatively coupled to the camera module assembly, to receive video data from the image sensors and data from the non-video sensors and to further encode and embed the non-video sensor data into the video signal.

2. The system of claim 1, wherein the embedded non-video sensor data is embedded by modulating the video signal during the vertical blanking interval (VBI) between frames and/or embedding non-video data in alternating lines or portions of alternating lines of an interlaced video signal in pre-defined locations for transmission to a coupled electronic device over a common transmission channel.

3. The system of claim 1, wherein the camera head is a mechanical self-leveling camera.

4. The system of claim 1, wherein the camera head is a digital self-leveling camera.

5. The system of claim 1, wherein the camera includes firmware and the camera firmware is boot loaded via the camera control unit or other wired or wirelessly connected electronic computing device.

6. The system of claim 1, wherein the camera head is authenticated at a communicatively coupled CCU or other wired or wirelessly connected electronic computing device as a theft deterrent prior to allowing video generation or transmission.

7. The system of claim 1, wherein the material of the pipe is determined in post processing based on comparison of non-video sensor data with a reference signature.

8. The system of claim 1, wherein the non-video sensors includes one or more humidity sensors.

9. The video camera system of claim 8, wherein the non-video sensors further include one or more motion sensors.

10. The system of claim 9, wherein the one or more motion sensors include a multi-axis motion sensor.

11. The system of claim 1, wherein the one or more non-video sensors include a microphone.

12. The system of claim 11, wherein the one or more non-video sensors include a humidity sensor.

13. The system of claim 12, wherein the one or more non-video sensors include a multi-axis motion sensor.

14. The system of claim 1, wherein the one or more non-video sensors include an acoustic sensor for sensing ultrasonic sound.

15. The system of claim 1, wherein the one or more non-video sensors include an acoustic sensor for sensing infrasonic sound.

16. The system of claim 1, wherein the one or more non-video sensors include a distance measuring device.

17. The system of claim 16, wherein the distance measuring device is an ultrasonic device.

18. The system of claim 16, wherein the distance measuring device is a laser device.

19. The system of claim 1, further including a push-cable operatively coupled to the camera head, wherein the video signal is adjusted for frequency dependent losses in the push-cable.

* * * * *